United States Patent
Ito et al.

(10) Patent No.: US 7,416,330 B2
(45) Date of Patent: Aug. 26, 2008

(54) METHOD AND APPARATUS FOR MEASURING TEMPERATURE OF SUBSTRATE

(75) Inventors: Masafumi Ito, 2-096, 5-17, Rinku-port Kita, Tajiri-cho, Sennan-gun, Osaka (JP) 598-0093; Yasuyuki Okamura, Santa (JP); Tatsuo Shiina, Wakayama (JP); Nobuo Ishii, Amagasaki (JP); Tomohiro Suzuki, Nirasaki (JP); Chishio Koshimizu, Nirasaki (JP)

(73) Assignees: Masafumi Ito, Sennan-gun (JP); Tokyo Electron Limited, Tokyo (JP)

( * ) Notice: Subject to any disclaimer, the term of this patent is extended or adjusted under 35 U.S.C. 154(b) by 185 days.

(21) Appl. No.: 11/196,402

(22) Filed: Aug. 4, 2005

(65) Prior Publication Data

US 2005/0271116 A1 Dec. 8, 2005

Related U.S. Application Data

(63) Continuation-in-part of application No. 10/964,647, filed on Oct. 15, 2004, now abandoned, which is a continuation-in-part of application No. PCT/JP03/04792, filed on Apr. 15, 2003.

(30) Foreign Application Priority Data

Apr. 15, 2002 (JP) ............................ 2002-112733

(51) Int. Cl.
*G01J 5/08* (2006.01)
*G01N 25/00* (2006.01)

(52) U.S. Cl. ............................. 374/127; 374/4; 374/7; 374/130; 374/161

(58) Field of Classification Search ................. 374/129, 374/130, 7, 43–44, 161, 4–5, 45, 120, 121, 374/127; 422/99; 356/43

See application file for complete search history.

(56) References Cited

U.S. PATENT DOCUMENTS

| 4,334,781 | A | * | 6/1982 | Ozeki | ........................ 356/368 |
| 4,365,896 | A | * | 12/1982 | Mihalow | ..................... 356/446 |
| 4,703,175 | A | * | 10/1987 | Salour et al. | .................. 356/45 |
| 4,911,015 | A | * | 3/1990 | Miller | .......................... 73/705 |
| 5,040,896 | A | * | 8/1991 | Moslehi | ...................... 356/453 |
| 5,060,505 | A | * | 10/1991 | Tury et al. | .................. 250/343 |
| 5,096,296 | A | * | 3/1992 | Lu | ............................. 356/484 |
| 5,263,776 | A | * | 11/1993 | Abraham et al. | ............ 374/161 |
| 5,738,440 | A | * | 4/1998 | O'Neill et al. | .................. 374/9 |

(Continued)

FOREIGN PATENT DOCUMENTS

JP 2-111020 4/1990

(Continued)

*Primary Examiner*—Gail Verbitsky
(74) *Attorney, Agent, or Firm*—Oblon, Spivak, McClelland, Maier & Neustadt, P.C.

(57) ABSTRACT

The temperature of the surface and/or inside of a substrate is measured by irradiating the front surface or rear surface of the substrate, whose temperature is to be measured, with light and measuring the interference of a reflected light from the substrate and a reference light. A method and apparatus for measuring temperature or thickness which is suitable for directly measuring the temperature of the outermost surface layer of a substrate, and an apparatus for treating a substrate for an electronic device, which uses such method, are provided.

8 Claims, 26 Drawing Sheets

STRUCTURAL DIAGRAM OF SYSTEM

U.S. PATENT DOCUMENTS

| | | | |
|---|---|---|---|
| 6,082,892 A * | 7/2000 | Adel et al. | 374/123 |
| 6,574,409 B1 * | 6/2003 | Moroni et al. | 385/129 |
| 6,697,160 B2 * | 2/2004 | Tsuda | 356/491 |
| 6,842,254 B2 * | 1/2005 | Van Neste et al. | 356/497 |
| 7,224,463 B1 * | 5/2007 | Zumberge et al. | 356/450 |
| 7,324,205 B2 * | 1/2008 | Howard | 356/450 |
| 2002/0085208 A1 * | 7/2002 | Hauger et al. | 356/479 |
| 2003/0086674 A1 * | 5/2003 | Yan et al. | 385/137 |
| 2005/0271116 A1 * | 12/2005 | Ito et al. | 374/120 |
| 2007/0009010 A1 * | 1/2007 | Shio et al. | 374/161 |
| 2007/0127034 A1 * | 6/2007 | Koshimizu et al. | 356/498 |

FOREIGN PATENT DOCUMENTS

| | | |
|---|---|---|
| JP | 3-196521 | 8/1991 |
| JP | 7-260592 | 10/1995 |
| JP | 7-260595 | 10/1995 |
| JP | 8-145811 | 6/1996 |
| JP | 9-172001 | 6/1997 |
| JP | 10-142078 | 5/1998 |

* cited by examiner

STRUCTURAL DIAGRAM OF SYSTEM

SYSTEM FOR MEASURING TEMPERATURE WITH LOW-COHERENCE
INTERFEROMETER OF OPTICAL FIBER TYPE

LINEAR EXPANSION COEFFICIENT $\alpha_{Si}$ AT RESPECTIVE TEMPERATURE OF Si

TEMPERATURE COEFFICIENT $\beta_{Si,1.55}$ OF CHANGE IN REFRACTIVE INDEX OF Si AT WAVELENGTH OF 1.55 $\mu$m SLD INTERFERENCE WAVEFORM (UPPER) AND LD INTERFERENCE
WAVEFORM (LOWER) DISPLAYED BY PROGRAM OUTPUT VOLTAGE OF LD INTERFERENCE WAVEFORM OBTAINED WHEN OPTICAL SYSTEM WAS NOT STABILIZED OUTPUT VOLTAGE OF LD INTERFERENCE WAVEFORM OBTAINED WHEN OPTICAL SYSTEM WAS STABILIZED (a) T=25°C (b) T=200°C INTERFERENCE WAVEFORM AT FRONT SURFACE AND REAR SURFACE OF Si BASED ON ANALYSIS RESULTS Fig.12
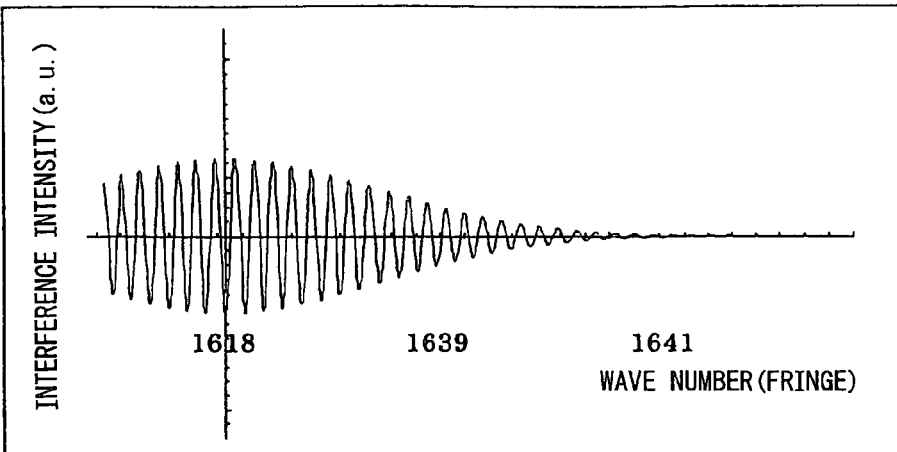
(a) T=25°C
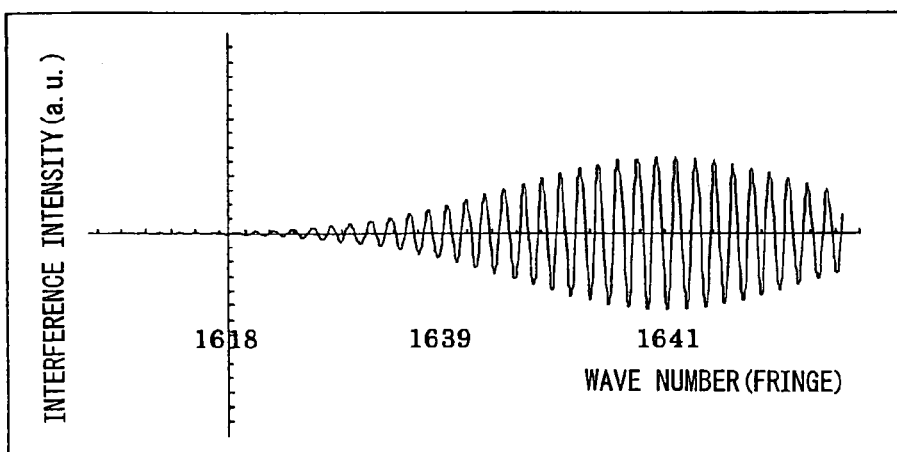
(b) T=200°C
ENLARGED DIAGRAM OF INTERFERENCE WAVEFORM IN REAR
SURFACE POSITION IN FIG. 11

SURFACE TEMPERATURE OF Si LAYER IN RELATION TO HEATER TEMPERATURE

THEORETICAL VALUES AND MEASURED VALUES OF LD INTERFERENCE WAVEFORM RELATING TO PEAKS OF SLD INTERFERENCE WAVEFORM ALONG WITH TEMPERATURE INCREASES IN Si MONOLAYER

Fig.16
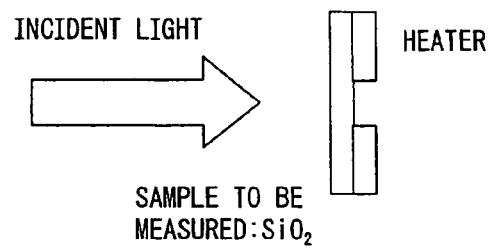
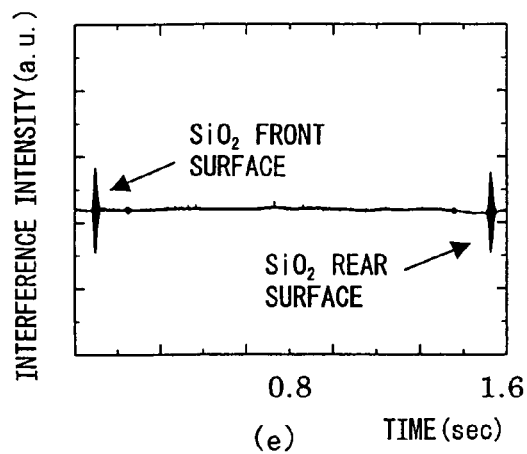
(e)
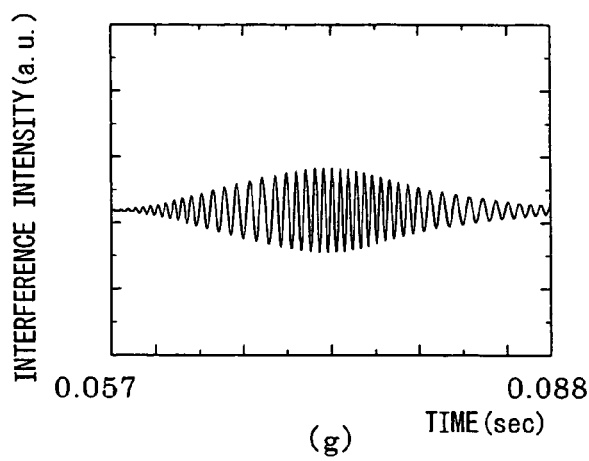
(g)
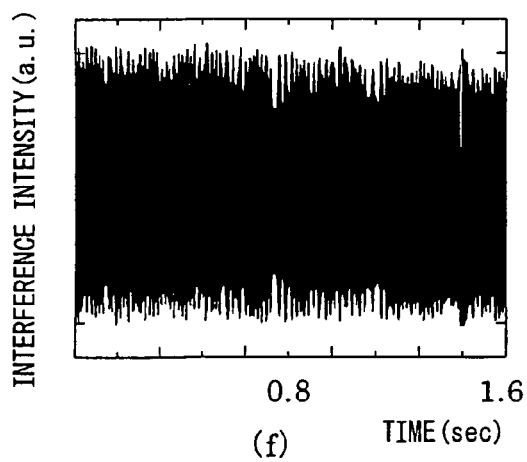
(f)
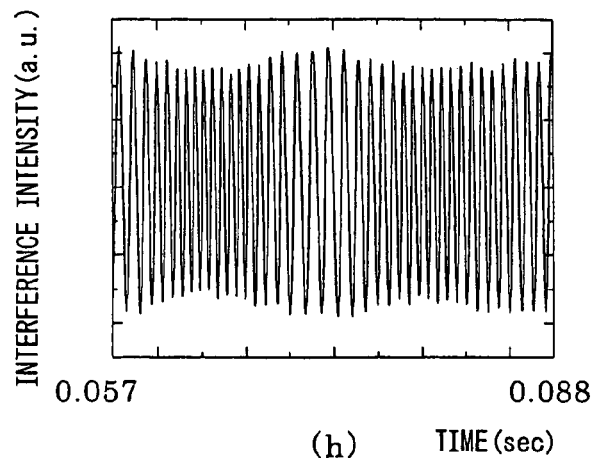
(h)

SURFACE TEMPERATURE OF SiO₂ LAYER IN (°C) RELATION TO HEATER TEMPERATURE

THEORETICAL AND MEASURED WAVE NUMBERS OF LD INTERFERENCE WAVEFORM RELATING TO PEAKS OF SLD INTERFERENCE WAVEFORM ALONG WITH TEMPERATURE INCREASES IN SiO₂ MONOLAYER

Fig.20
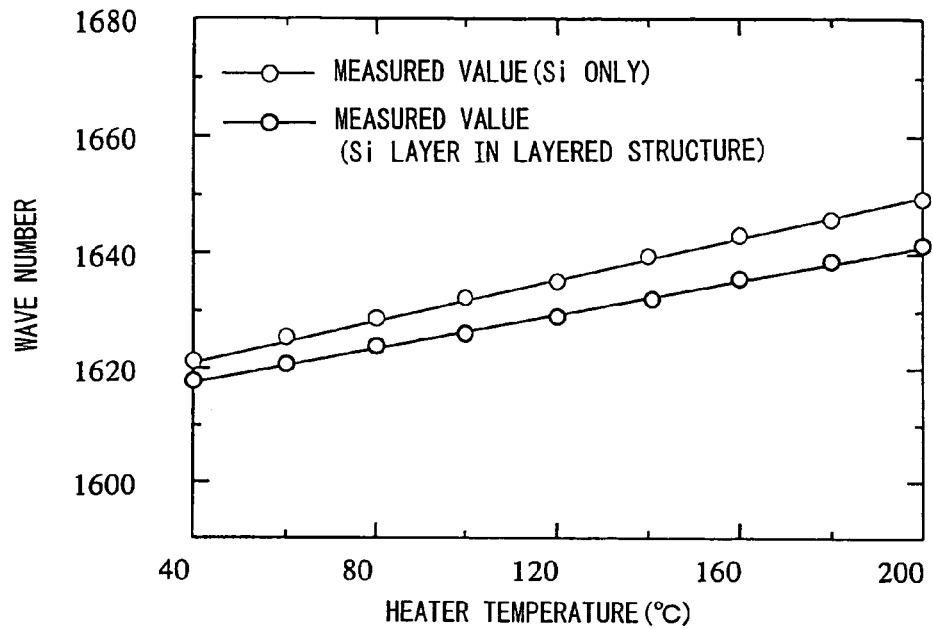
(a) COMPARISON IN WAVE NUMBER CHANGE BETWEEN Si ONLY AND Si LAYER IN LAYERED STRUCTURE
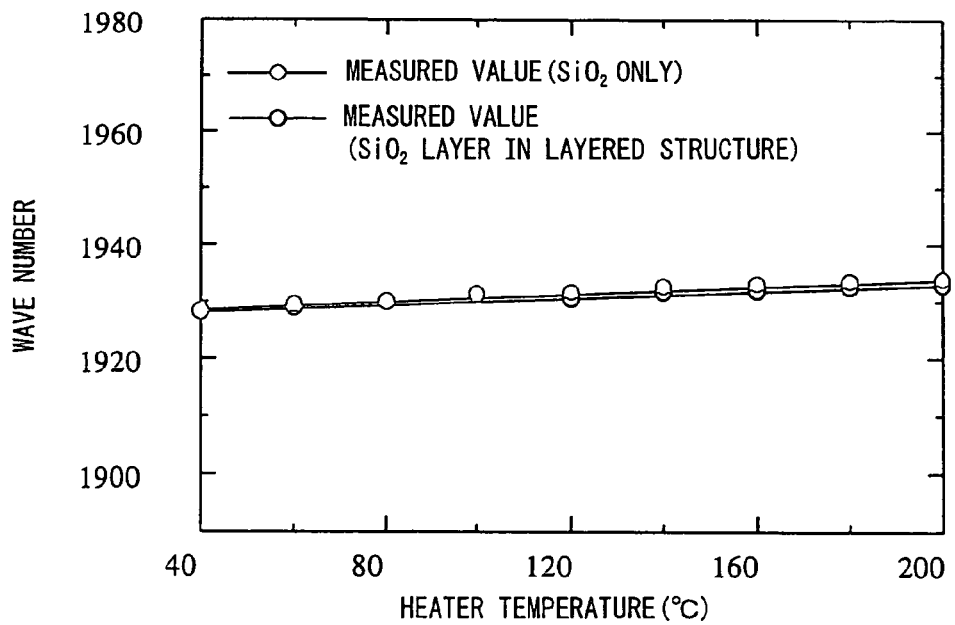
(b) COMPARISON IN WAVE NUMBER CHANGE BETWEEN Si ONLY AND $SiO_2$ LAYERED STRUCTURE
MEASUREMENT RESULTS OBTAINED BY USING Si, $SiO_2$ LAYERED STRUCTURE

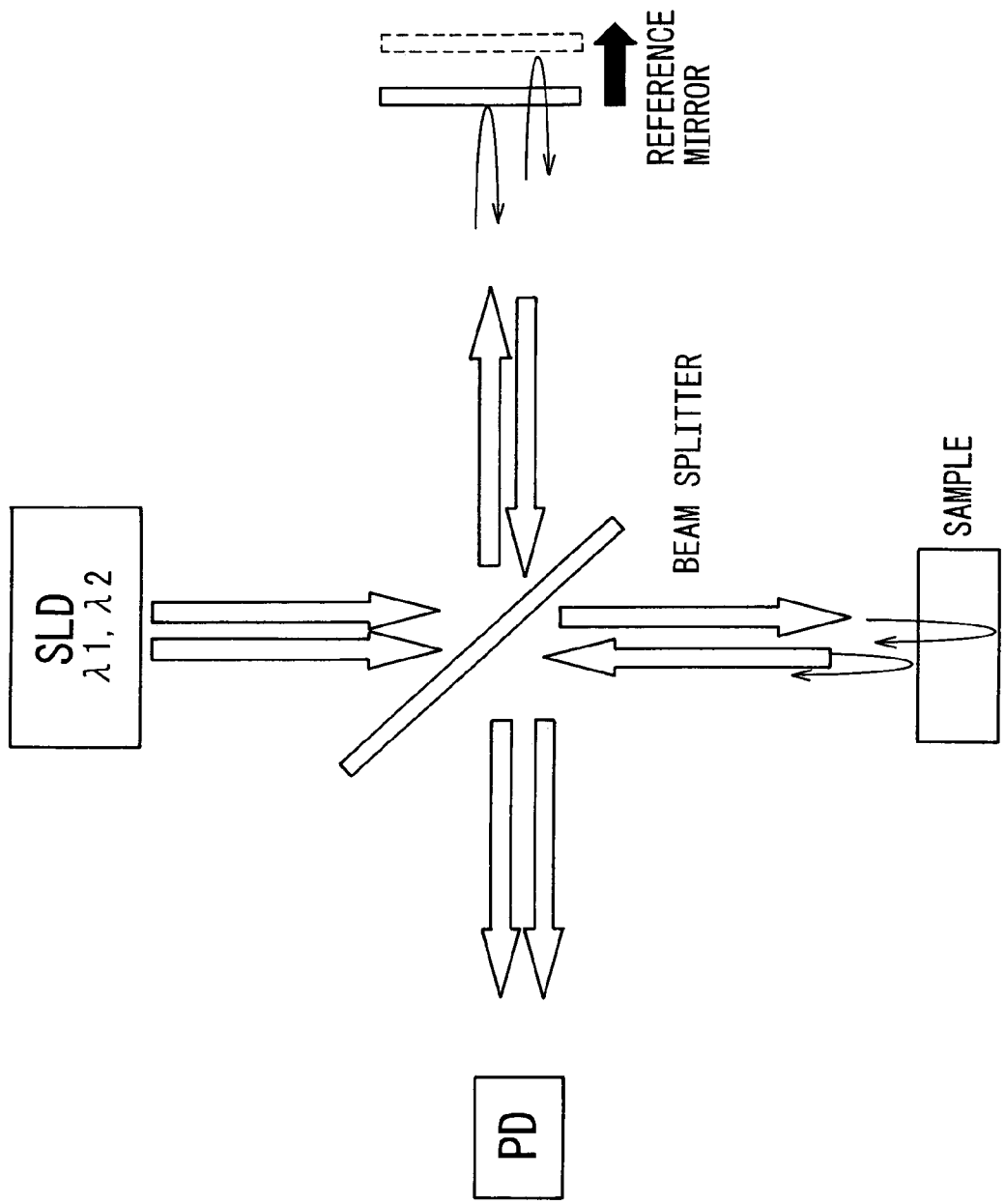

METHOD AND APPARATUS FOR MEASURING TEMPERATURE OF SUBSTRATE

RELATED APPLICATION

This is a continuation-in-part application of U.S. application Ser. No. 10/964,647, filed on Oct. 15, 2004, which is a continuation-in-part application of International Application No. PCT/JP03/04792, filed on Apr. 15, 2003 for METHOD AND APPARATUS FOR MEASURING TEMPERATURE OF SUBSTRATE.

BACKGROUND OF THE INVENTION

1. Field of the Invention

The present invention relates to a method and apparatus capable of accurately measuring the temperature of the front surface, rear surface, and/or inside of a substrate. More specifically, the present invention relates to a method and apparatus capable of accurately measuring the temperature of the front surface, rear surface, and/or inside of a substrate by using the interference phenomenon of low-coherence light and to an apparatus for treating substrates for devices which uses those method and apparatus.

The term "device" as used in the present specification means to include electronic and/or mechanical devices. Thus, in the present specifically, the term "device" is used in the meaning including electronic devices (semiconductor devices, liquid-crystal devices, organic EL devices, and the like) and very small devices such as the so-called micromachines.

2. Related Background Art

When a physical and/or chemical treatment is conducted on a variety of substrates, e.g., from silicon, accurately measuring the temperature of the front surface, rear surface, and/or inside of the substrate is very important from the standpoint of accurately controlling properties and physical characteristics of the product which is to be obtained by the treatment.

For example, in the field of fine processing based on lithographic technology in the field of semiconductor processes and micromachines where surface treatment methods are presently widely used, the treatment employing gas-phase reactions (for example, physical vapor deposition (PVD) and chemical vapor deposition (CVD), which represent deposition processes, and etching, plasma treatment, and heat treatment such as annealing) are frequently used.

In the field of devices, including electronic devices, primarily semiconductor devices and liquid-crystal devices, which have to be produced by presently available semiconductor processes, and micromachines, the requirements placed on quality improvement of the electronic devices which are the resultant product created a demand for multilayer structures and quality improvement in each of thin films constituting the device. Usually, actual products obtained in those thin film formation processes are extremely frequently affected by temperature. For this reason, the importance of temperature control in the outermost surface layer of the substrate or multilayer structure, which is to be treated, increases and cannot be underestimated.

For example, in processes using plasma, the outermost surface layer of the substrate to be treated, is irradiated with heat from plasma. In this case, it is clear that there is a difference between the outermost surface layer and rear surface of the substrate. Measurement methods employing resistance thermometers or fluorescent thermometers measuring the temperature of the rear surface of the substrate have been employed as temperature measurement methods for measuring the temperature of the surfaces.

However, In the above-described conventional processes, it was very difficult to measure directly the temperature of the outermost surface layer of the substrate due to restrictions placed by the structure and operation principle of the apparatus.

DISCLOSURE OF INVENTION

An object of the present invention to provide a method for measuring temperature, which resolves the above-described problem encountered in the prior art.

Another object of the present invention to provide a method for measuring temperature, which is capable of directly measuring the temperature of the outermost surface layer of a substrate.

As a result of earnest study, the present inventors have found that measuring the temperature of the surface or the inside of a substrate by using light interference is very effective for attaining the above-described object.

The method for measuring temperature in accordance with the present invention is based on this discovery. More specifically, the present invention provides a method for measuring temperature, comprising:

irradiating with light the front surface or rear surface of a substrate, whose temperature is to be measured, and measuring the interference of a reflected light from the substrate and a reference light, to thereby measure the temperature of the front surface, rear surface, and/or inside of the substrate.

The present invention also provides a control method comprising the steps of:

irradiating with light the front surface or rear surface of a substrate to be treated, whose temperature is to be measured, in an apparatus for treating the substrate to be treated, measuring the interference of a reflected light from the substrate and a reference light, to thereby measure the temperature of the front surface, rear surface, and/or inside of the substrate, and adjusting and/or controlling an operation variable of the apparatus based on the result of the measurement.

The present invention further provides a treatment method comprising the steps of:

irradiating with light the front surface or rear surface of a substrate to be treated, whose temperature is to be measured, in an apparatus for treating the substrate to be treated, measuring the interference of a reflected light from the substrate and a reference light, to thereby measure the temperature of the front surface, rear surface, and/or inside of the substrate, and and a reference light; and adjusting and/or controlling an operation variable relating to the treatment of the substrate to be treated, based on the result of the measurement.

The present invention further provides an apparatus for measuring temperature, comprising:

light irradiation means for irradiating with light the front surface or rear surface of a substrate whose temperature is to be measured;

a splitter for splitting the light into a reference light and a measurement light;

reference light reflecting means for reflecting the reference light;

optical path changing means for changing the optical path length of light reflected from the reference light reflecting means; and light receiving means for measuring the interference of the reflected light from the substrate and the reference light from the reference light reflecting means, wherein the temperature of the front surface, rear surface and/or inside of the substrate is measured based on the measurement of the interference.

The present invention further provides an apparatus for treating a substrate for a device, comprising:

a treatment chamber for conducting a treatment of the substrate for a device; and temperature measurement means for measuring the temperature of the front surface, rear surface, and/or the inside of the substrate to be disposed and treated in the treatment chamber, wherein the temperature measurement means comprises:

light irradiation means for irradiating with light the front surface or rear surface of the substrate to be treated and whose temperature has to be measured;

a splitter for splitting the light into a reference light and a measurement light, reference light reflecting means for reflecting the reference light;

optical path changing means for changing the optical path length of the light reflected from the reference light reflecting means; and light receiving means for measuring the interference of the reflected light from the substrate and the reference light from the reference light reflecting means.

The present invention further provide an apparatus for measuring temperature or thickness, comprising: light source means for irradiating with light the front surface or rear surface of a substrate whose temperature or thickness is to be measured; a splitter for splitting the light into a reference light and a measurement light; reference light reflecting means for reflecting the reference light; optical path changing means for changing the optical path length of light reflected from the reference light reflecting means; and light receiving means for measuring the interference of the reflected light from the substrate and the reference light from the reference light reflecting means, wherein the temperature or thickness of the front surface, rear surface and/or inside of the substrate is measured based on the measurement of the interference;

wherein the light source means comprises: one light source or two light sources having different wavelengths, for measuring the temperature or thickness of the substrate; and a displacement-measuring light source for measuring the displacement in the optical path changing means; and the light receiving means comprises: one or two light-receiving devices corresponding to the one or two light sources, for receiving the interference light based on the light from the one or two light sources, which has been reflected from the substrate and the reference light reflecting means; and a displacement-measuring light-receiving device for receiving the interference light based on the light from the displacement-measuring light source, which has been reflected from the substrate and the reference light reflecting means.

In this apparatus for measuring temperature or thickness the light source for measuring the temperature or thickness of the substrate may preferably have a wavelength of 0.3-20 μm, and a coherence length of 0.1-100 μm.

In this apparatus for measuring temperature or thickness the light source means comprise may preferably two light sources, one of which has a wavelength providing a relatively large temperature coefficient of change in refractive index of the substrate, and the other of which has a wavelength providing a relatively small coefficient of temperature change in the refractive index of the substrate.

In the present specification "the temperature of the front surface, rear surface and/or inside of the substrate", which is to be measured, includes at least one temperature selected from the group consisting of the following temperatures (1) to (7). (1) Temperature of the front surface of the substrate.

(2) Temperature of the rear surface of the substrate.

(3) Temperature of the inside of the substrate.

(4) Temperature of the front surface and rear surface of the substrate.

(5) Temperature of the front surface and inside of the substrate.

(6) Temperature of the rear surface and inside of the substrate.

(7) Temperature of the front surface, rear surface, and inside of the substrate.

(8) Average temperature of the front surface, rear surface, and inside of the substrate.

BRIEF DESCRIPTION OF DRAWINGS

FIG. 12 is a graph illustrating an enlarged drawing of an interference waveform in the rear surface position shown in FIG. 11.

FIG. 16 is a graph illustrating SLD interference waveforms (e), (g) obtained from the temperature measurement system, and LD interference waveforms (f), (h) obtained from the displacement measurement system. (g) and (h) show the enlarged surface interference waveforms of the measurement sample $SiO_2$.

FIG. 20 is a graph illustrating the results obtained in measuring temperature by using Si and $SiO_2$ layered structure.

FIG. 31 is a block diagram illustrating another example of an apparatus for measuring temperature (an example in which optical fibers are not used) in accordance with the present invention.

DETAILED DESCRIPTION OF PREFERRED EMBODIMENTS

Figure 1:
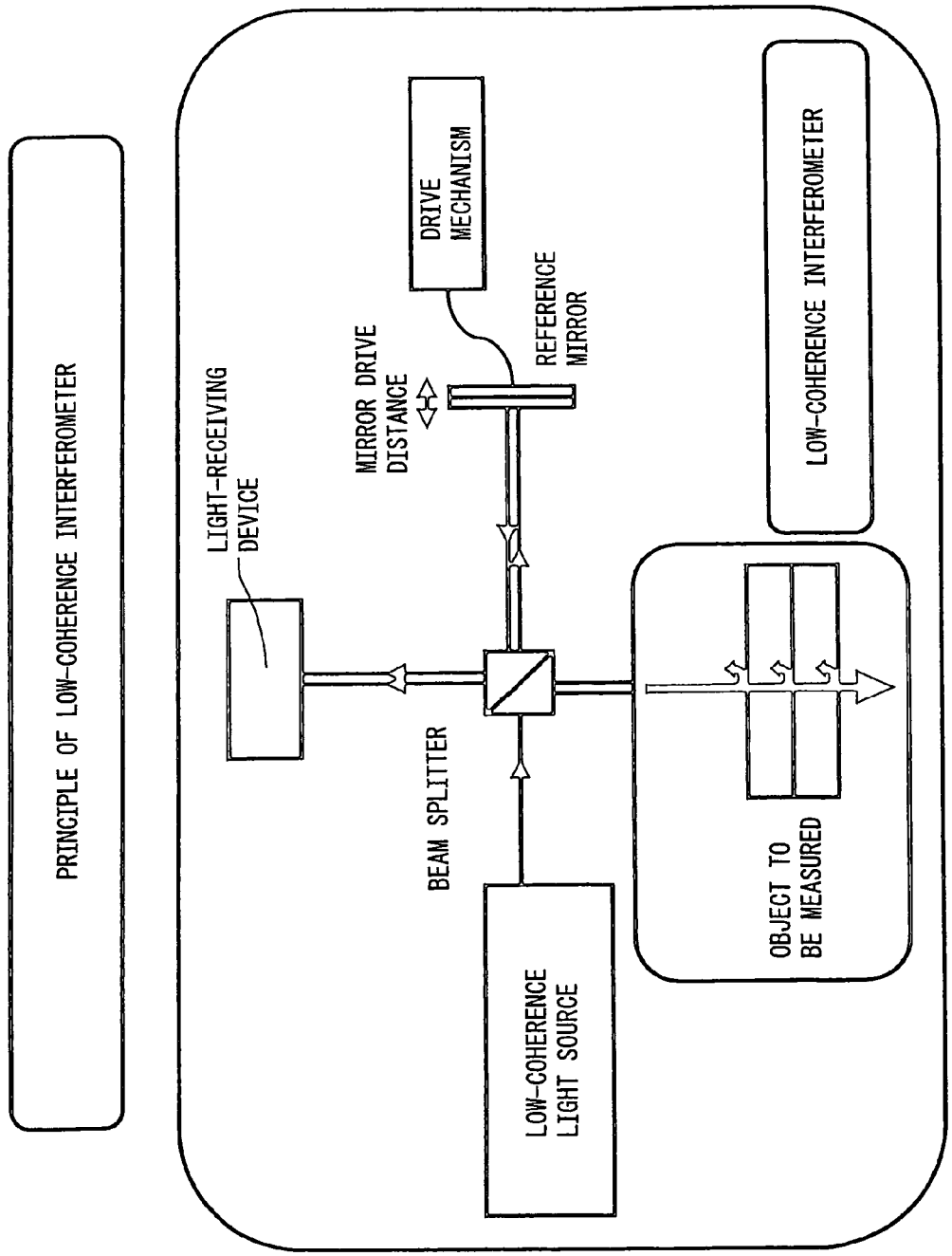
FIG. 1 is a block diagram illustrating an example of low-coherence interference that can be used in accordance with the present invention.

The present invention will be described hereinbelow in greater detail with reference, when necessary, to the appended drawings. In the description below, "parts" and "%" representing weight ratios are based on a mass standard, unless stated otherwise.

(Apparatus for Measuring Temperature)

The apparatus for measuring temperature in accordance with the present invention comprises light irradiation means for irradiating with light the front surface or rear surface of the substrate whose temperature has to be measured, a splitter for splitting the light into a reference light and a measurement light, reference light reflecting means for reflecting the reference light, optical path changing means for changing the optical path length of the light reflected from the reference light reflecting means, and light receiving means for measuring the interference of the reflected light from the substrate and the reference light from the reference light reflecting means.

In accordance with the present invention, the above-described optical system can be composed of a usual optical system (optical system with spatially matched optical axes). However, from the standpoint of increasing the degree of freedom in selecting the disposition of each optical element and reducing the size of the entire optical system, it is preferred that the optical system be composed by using optical fibers.

In accordance with the present invention, any light can be used, provided that the interference of the reflected light from the substrate and the reference light can be measured. However, in order to avoid the damage caused by "excess interference", in order words, to avoid interference of the reflected light due to the difference between the front surface and rear surface of the substrate (usually, about 500-1500 μm), which is to be measured, and to enable easy measurement of interference of the reference light with the reflected light from the front surface (or from a layer inside the substrate) of the substrate, which is to be measured, it is preferred that a low-coherence light be used. Here, "the low-coherence light" means a light with a small coherence length. In accordance with the present invention, for example, the below-described light can be advantageously used as "a low-coherence light".

Central wavelength: preferably 0.3-20 μm, even more preferably 0.5-5 μm; coherence length: preferably 0.1-100 μm, even more preferably 3 μm or less (Low-Coherence Light Source).

No specific limitation is placed on the operation principle, form, size and method of use of the low-coherence light source, provided it can supply the above-described low-coherence light to the substrate whose temperature is to be measured. Examples of the low-coherence light source that can be used in accordance with the present invention are presented below. SLD (Super Luminescent Diode), LED, high-luminosity lamps (tungsten lamp, xenon lamp, and the like), light sources with an ultrawide wavelength band.

Of those low-coherence light sources, SLD is preferably used because it has a high luminosity.

(Splitter)

In accordance with the present invention, no specific limitation is placed on the operation principle, form, size and method of use of the splitter, provided it can split light into a reference light and a measurement light. Examples of the splitters that can be used in accordance with the present invention are presented below.

Fiber coupler.
Optical waveguide splitter.
Semitransparent mirror.

Of those splitters, an optical fiber coupler is preferred because of its compatibility with optical fibers.

(Reference Light Reflection Means)

In accordance with the present invention, no specific limitation is placed on the operation principle, form, size and method of use of the reference light reflection means, provided that it can reflect the reference light. Examples of the reference light reflection means that can be used in accordance with the present invention are presented below.

Reference mirror (corner cube prism, flat mirror, and the like).

Delay line (similar to optical path changing means such as delay line of a piezoelectric tube type).

Among those reference light reflection means, the corner cube prism is preferred because of good parallelism of the reflected light and incident light.

(Optical Path Changing Means)

In accordance with the present invention, no specific limitation is placed on the operation principle, form, size and method of use of the optical path changing means, provided that it can vary the optical path length of the light reflected from the reference light reflection means. Examples of the optical path changing means that can be used in accordance with the present invention are presented below.

Delay line of a voice coil motor type.
Delay line of a piezoelectric tube type.
Delay line of a direct stage type.
Delay line of a stacked piezoelectric type.

Of those optical path changing means, the voice coil motor is preferably used because of its high speed and large variable optical path length.

(Light Receiving Means)

In accordance with the present invention, no specific limitation is placed on the operation principle, form, size and method of use of the light receiving means, provided that it can measure the interference with the reference light from the reference light reflection means. Examples of the light receiving means that can be used in accordance with the present invention are presented below.

Photodiode.
Avalanche photodiode.
Photoelectron multiplier.

Of those light receiving means, the photodiode is preferably used because of its low cost and compactness.

(Method for Converting to Temperature)

In accordance with the present invention, no specific lamination is placed on the method for converting the degree of interference into temperature, provided that the interference of the reflected light from the above-described substrate (whose temperature is to be measured) and the reference light from the reference light reflection means can be used. Examples of the methods that can be used for such conversion into temperature are presented below.

Method using changes in the optical path based on changes in temperature.

Method using absorption intensity changes based on changes in temperature.

Method combining the two above-described methods.

Among them, the conversion method using changes in the optical path based on changes in temperature is preferred from the standpoint of accuracy and easiness of conversion.

(Method for Measuring Temperature)

In accordance with the present invention, the temperature of the front surface or the inside of a substrate is measured by irradiating the front surface or rear surface of the substrate whose temperature is to be measured and measuring the interference of the reflected light from the substrate and the reference light.

(Preferred Modes for Measuring Temperature)

Examples of the preferred modes for measuring temperature in accordance with the present invention are presented below.

(1) A mode of measuring the temperature of the front surface or inside of a substrate by irradiating the front surface or rear surface of the substrate, whose temperature is to be measured, with light and measuring the interference of the reflected light from the substrate and the reference light, and adjusting and/or controlling other variables based on the measurement result.

(2) A mode in which the temperature to be measured is the temperature of the front surface of the substrate, and the variable is the temperature of a susceptor for holding the substrate.

(3) A mode in which the temperature to be measured is the temperature of the front surface of the substrate, and the variable is at least one process parameter selected from the group consisting of the total flow rate of a gas to be supplied into a container containing the substrate, gas flow rate ratio, gas pressure, plasma-generating power, and bias power.

(4) A mode in which the temperature to be measured is the temperature distribution on the front surface, and the variable is at least one selected from the group consisting of zone control of the susceptor temperature, attraction force zone control of the susceptor electrostatic chuck, and zone control of plasma-generating power.

(5) A mode in which the temperature to be measured is the temperature distribution on the front surface, and the variable is at least one selected from the group consisting of the total flow rate of a gas to be supplied into a container containing the substrate or distribution of the total flow rate, gas flow rate ratio or distribution thereof, gas pressure, plasma-generating power, and bias power.

(6) A mode in which the temperature to be measured is the temperature history of the front surface while the substrate is being processed, and the adjustment and/or control of the variable is conducted as part of APC processing (statistic processing of data with the object of controlling subsequent device substrate treatment) based on the decision relating to the treatment results.

(Preferred Combinations with Other Processes)

The above-described method for measuring temperature in accordance with the present invention may be combined, if necessary, with other processes. No specific limitation is placed on "other processes" that have to be thus combined, provided that they are the processes in which the temperature of the substrate to be treated, produces a certain effect. From the standpoint of possibility of the temperature producing an especially large effect, it is preferred that a combination with etching, film formation, heat treatment such as annealing, and the like be employed.

Examples of preferred combinations with the other processes preferred in accordance with the present invention are described below.

(1) A mode of measuring the temperature of the front surface or the inside of a substrate by irradiating the front surface or rear surface of the substrate, whose temperature is to be measured, with light and measuring the interference of a reflected light from the substrate and a reference light, and adjusting and/or controlling a variable relating to the treatment of the substrate based on the measurement result.

(2) A mode in which the treatment of the substrate is the formation of a film on the substrate.

(3) A mode comprising measuring the surface temperature or the average temperature inside the substrate prior to the treatment and determining the starting point of the treatment.

(4) A mode in which the treatment is started by turning on the plasma-generating power and/or bias power; a mode comprising measuring the film thickness during the treatment and determining the end point of the treatment.

(5) A mode comprising measuring the temperature of the second layer from the surface during the treatment and employing it as a temperature of the outermost surface (the surface of the substrate where the film has been formed).

(6) A mode in which the treatment of the substrate is etching of the substrate.

(7) A mode comprising measuring the surface temperature or the average temperature inside the substrate prior to the treatment and determining the starting point of the treatment.

(8) A mode in which the treatment is started by turning on the plasma-generating power and/or bias power.

(9) A mode comprising measuring the temperature of the layer, which is to be treated, during the treatment. A mode comprising measuring the temperature of the second layer from the surface during the treatment and employing it as a temperature of the outermost surface (the surface of the substrate where the film has been formed).

(Substrate)

In accordance with the present invention, no specific limitation is placed on the configuration of the substrate whose temperature is to be measured. Thus, the temperature measurement in accordance with the present invention can be conducted on a substrate composed of a substantially single material and/or a substrate comprising a plurality of layers or portions. In accordance with the present invention, substrates for semiconductors (for example, Si wafers), substrates for liquid-crystal devices, and substrates for micromachines can be advantageously used.

(Examples of Preferred Substrates)

Examples of substrates on which temperature measurements can be conducted advantageously in accordance with the present invention are described below.

Si substrates.
Quartz substrates.
$SiO_2$ substrates.
$Si_3N_4$ substrates.
Substrates comprising layers of the above-mentioned materials.
Substrates used in the LSI fabrication process.

(Principle of Temperature Measurements)

In accordance with the present invention, it is preferred that the temperature of the substrate surface be measured by using interference based on a low-coherence light. No specific limitation is placed on the interference measurement method that can be used in accordance with the present invention. However, it is preferred that a Michelson's interferometer be used as a base device because it measures interference from one side of the substrate.

(Low-Coherence Interferometer)

A diagram (block diagram) illustrating an example of the entire low-coherence interferometer that can be advantageously used in accordance with the present invention is shown in FIG. 1. This low-coherence interferometer is based on the Michelson's interferometer. As shown in FIG. 1, a SLD (Super Luminescent Diode) having a low degree of coherence is used as a light source, the light emitted from the light source is divided into two beams with a beam splitter, one of the beams is reflected by each layer toward the measurement object, and the other beam propagates to a reference mirror and is reflected. At this time, the respective light beams are classified as "physical light" and "reference light". The beams then reach the beam splitter again, where they are superimposed and undergo interference, followed by the detection with a light receiving device.

When such measurements are conducted, the reference mirror is driven to obtain information in the depth direction of the measurement object.

The coherence length of the light from the light source is small due to a low degree of coherence of the light source. Therefore, strong interference occurs in zones where the optical path length of the physical light matches the optical path length of the reference light (usually, the interference decreases substantially in other zones). When the reference mirror is driven back and forth and the optical path length of the reference light is changed, the reference light and the reflected light caused by the difference in refractive index in each layer of the measurement body interfere. As a result, measurements in the depth direction of the measurement body become possible.

(Measurement Principle of Low-Coherence Interferometer)

When the distance from the beam splitter to the reference mirror in the low-coherence interferometer shown in FIG. 1 is considered as a distance to the measurement object, if the plane light waves that are reflected by the reference mirror and measurement object and reach the light receiving devices are represented as $$e_1(t)=E_1\cos(2\pi ft-2kl_1-\phi) \quad (2\text{-}1)$$

$$e_2(t)=E_2\sqrt{R}\cos(2\pi ft-2kl_2-\phi) \quad (2\text{-}2)$$

then the photoelectric current from the light receiving device will be as follows:

$$i=|e_1(t)+e_2(t)|^2=i_{DC}+\tilde{i}_1 \quad (2\text{-}3)$$

Here, $\kappa=2\pi f/c$, f denotes a frequency, c—a light speed, and R—a reflection factor of the measurement object surface. In the photoelectric current, $i_{DC}=(E_1^2+E_2^2)/2$ is a direct current component and $$\tilde{i}_1=E_1E_2\sqrt{R}\cos(4\pi f\Delta l/c) \quad (2\text{-}4)$$

is an optical interference term in which the difference in optical path lengths is a variable of a sine function.

Formula (2-4) presented hereinabove suggests that in optical interference measurements using a low-coherence interferometer, the optical interference signal can be considered as a sum of a large number of sine functions with different periods. This can be mathematically represented in the following form.

$$\tilde{i}_1=\int E_1E_2\sqrt{R}\cos(4\pi f\Delta l/c)\cdot S(f)df \quad (2\text{-}5)$$

Here, if the function is considered as a Gauss function of a central frequency, then equation (2-5) can be presented as follows.

$$\tilde{i}_1 = E_1E_2\sqrt{R}\,\exp\left\{-\left[\frac{\Delta l}{\frac{l_c}{2\sqrt{\ln 2}}}\right]^2\right\}\cdot\cos(2k\Delta l) \quad (2\text{-}6)$$

Here, $l_c$ is a coherence length. When the reference light mirror is moved as a speed v, then the results are affected by the Doppler shift and the following representation is possible: $f_D=2v/\lambda_o$. $\lambda_o$ is a central wavelength of the light source.

(Phase Changes Caused by Changes in Temperature)

Because the sample of the temperature measurement system is heated with a heater or the like, the sample is expanded and the refractive index thereof changes. Therefore, the width of the peak position of the interference waveform obtained with the temperature measurement system after the temperature has changed differs from those prior to changes in temperature. Accordingly, changes in temperature can be detected by accurately measuring the peak position, with the interference waveform obtained with the width displacement measurement system as a standard, or by accurately measuring the movement time of reference light optical path length variation means which moves with a constant speed pattern.

Figure 2:
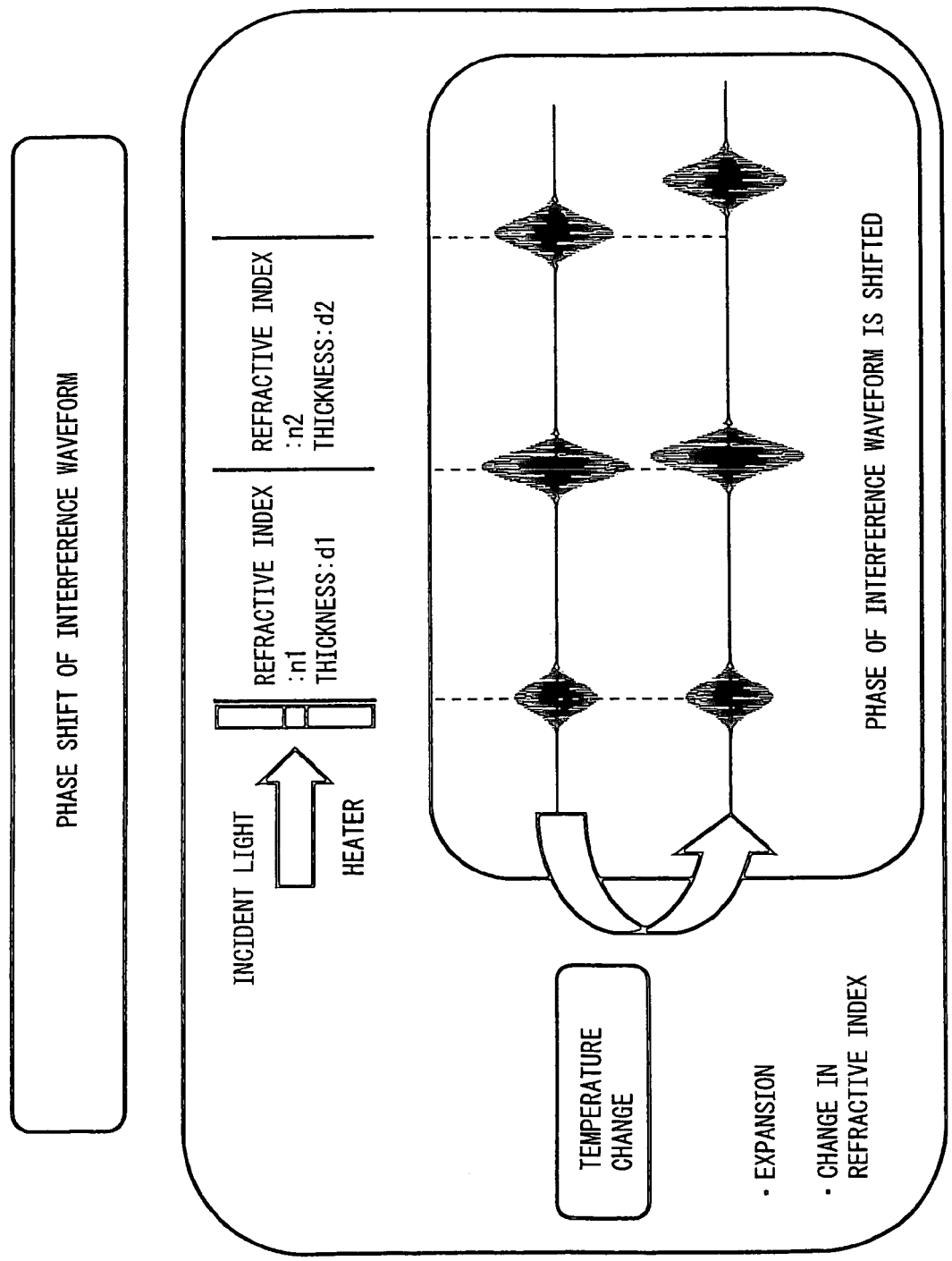
FIG. 2 is a graph illustrating an example of phase shift caused by changes in temperature.

Let us consider measurement samples denoted by A and B in FIG. 2. Here, the thickness and refractive index of the measurement sample A is $d_1$ and $n_1$, respectively. The thickness and refractive index of the measurement sample B is $d_2$ and $n_2$, respectively. As for the interference waveform obtained by using a Michelson's interferometer, it was mentioned above that an interference waveform shown in the frame in the lower right portion of FIG. 2 is obtained due to the interference of the reflected light from the surface of A, boundary surface of A and B, and rear surface of B, when the incident light and measurement samples A, B are disposed relative to each other as shown in the figure.

For example, if we assume that the interference waveform detected at room temperature has a spacing as shown on the upper side in the frame, then if the temperature of the measurement samples is increased, the positions of the peaks in two positions of the interference waveform peaks located in three positions will shift with respect to one end as a reference, due to thermal expansion and changes in the refractive index depending on the temperature of each measurement sample. This shift, with respect to thickness, depends on the "linear thermal expansion coefficient α", which is inherent to each sample and, with respect to changes in the refractive index, depends on the "temperature coefficient β of changes in the refractive index", which is inherent to each sample. If the thickness and refractive index after changes in temperature are denoted by $d_1'$ and $n_1'$, respectively, for the measurement sample A, then they can be represented as follows:

$$d'_1 = d_1(1+\alpha_A \Delta T_1), n'_1 = n_1(1+\beta_A \Delta T_1) \quad (2\text{-}7)$$

Similarly, if the thickness and refractive index after changes in temperature are denoted by $d_2'$ and $n_2'$, respectively, for the measurement sample B, then they can be represented as follows:

$$d'_2 = d_2(1+\alpha_B \Delta T_2), n'_2 = n_2(1+\beta_B \Delta T_2) \quad (2\text{-}8)$$

Here, assigning respective indexes to the linear thermal expansion coefficient α and temperature coefficient β of changes in the refractive index means that those are the values inherent to each sample. Furthermore, the temperature in each layer is supposed to be uniform. If the state changes due to changes in temperature, then optical path length of the light passing through each sample will also change. The optical path length is determined as a product of the thickness and refractive index. Therefore, if the optical path length of the light that passes through the measurement sample A prior to changes in temperature is denoted by $l_A$, then $$l_A = n_1 d_1 \quad (2\text{-}9)$$

and the optical path length after the temperature has changed by ΔT becomes $$l'_A = n'_1 d'_1 \quad (2\text{-}10).$$

Similar changes are also valid for the measurement sample B.

$$l_B = n_2 d_2 \quad (2\text{-}11)$$

$$l'_B = n'_2 d'_2 \quad (2\text{-}12)$$

Therefore, the difference in the results before and after changes in temperature corresponds to the phase shift of the interference waveform. As a result, the interference waveform shown in the lower part inside the frame in FIG. 2 is obtained. Reading this shift in phase caused by changes in temperature makes it possible to determine changes in temperature of each measurement sample.

(System Configuration)

In accordance with the present invention, no specific limitation is placed on the measurement system, provided that the interference between the reflected light from the substrate and the reference light can be measured by irradiating the substrate, whose temperature is to be measured, with a low-coherence light. From the standpoint of accurately reading the phase shift, the below-described system configuration can be advantageously used.

(Example of Preferred System Configuration for Measuring Temperature)

Figure 3:
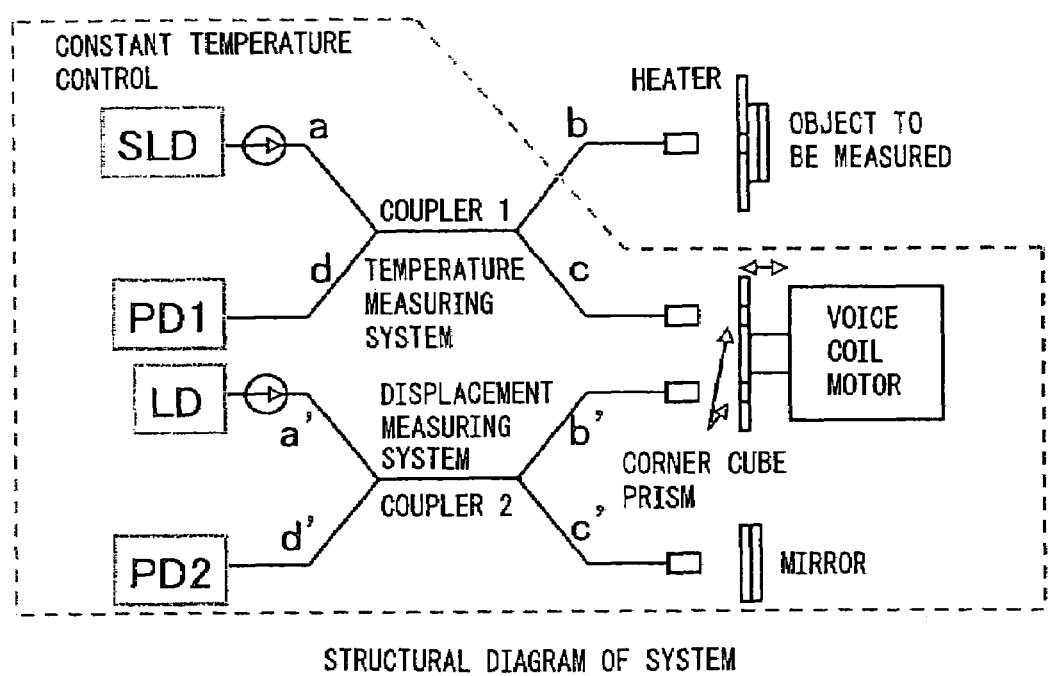
FIG. 3 is a block diagram illustrating an example of a system configuration for measuring temperature, which can be used in accordance with the present invention.
Figure 4:
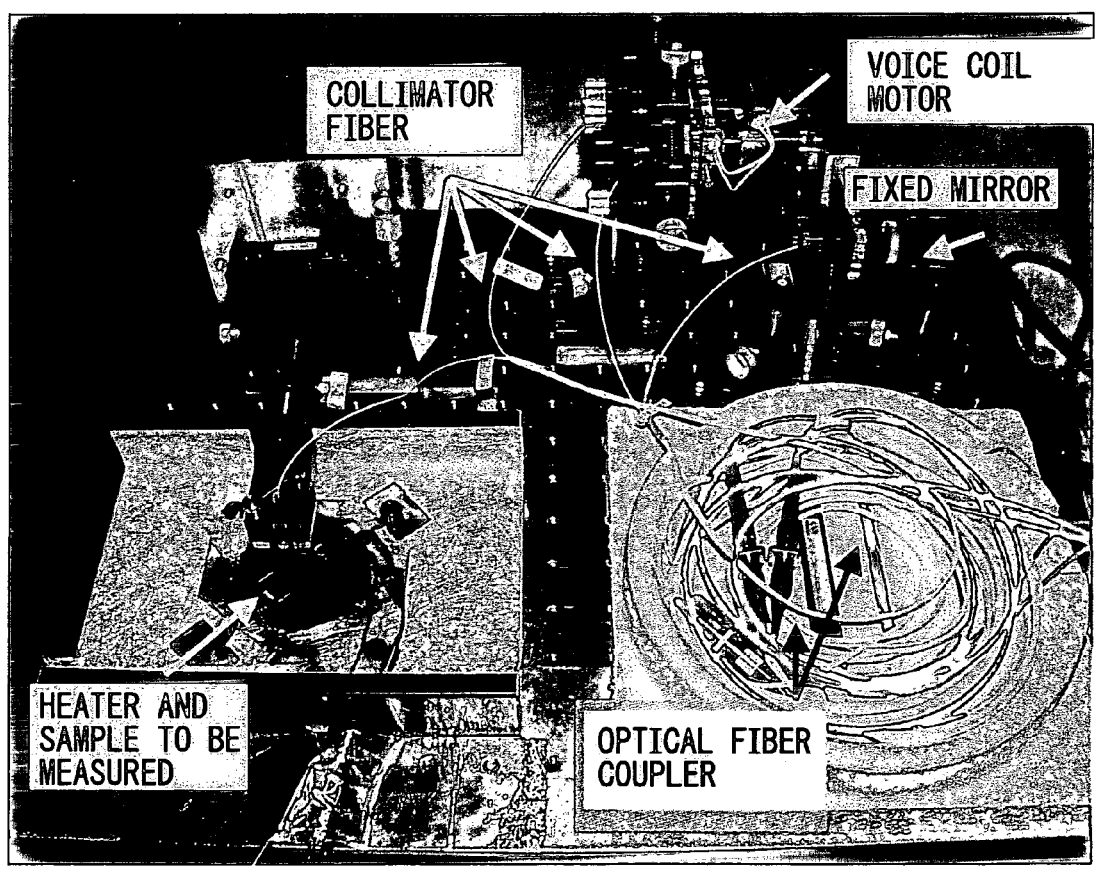
FIG. 4 is a photo illustrating an example of a system configuration used in the present embodiment.
Figure 5:
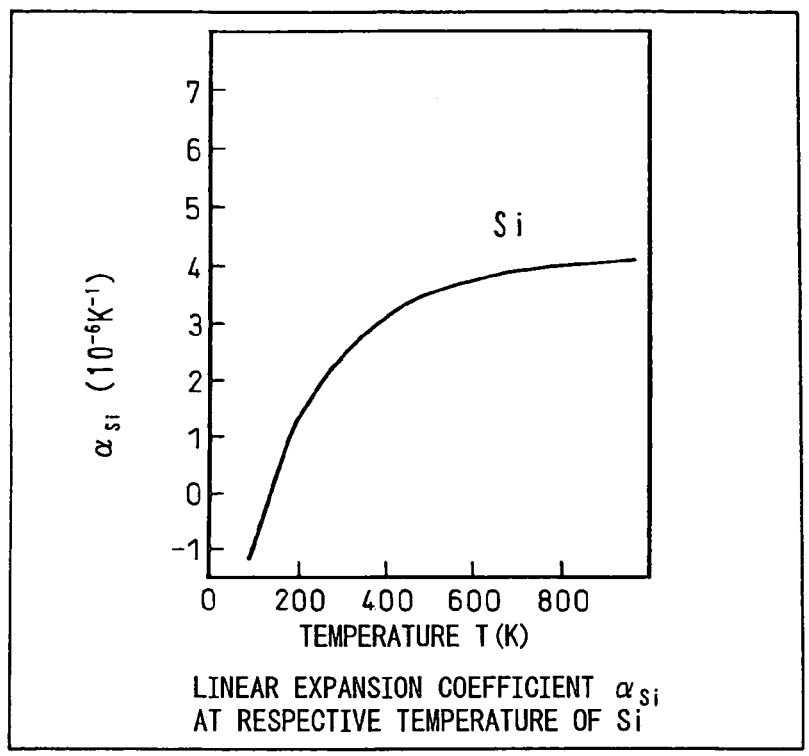
FIG. 5 is a graph illustrating a linear expansion coefficient of Si at various temperatures.

A structural diagram (block diagram) illustrating an example of the system of measuring temperature and characteristics of the system are shown in FIG. 3 and Table 1. A schematic drawing of the actual measurement system is shown in FIG. 4.

| | System characteristics |
|---|---|
| Light source of temperature measurement system | SLD (Super Luminescent) Wavelength: 1.55 μm, output: 1.5 mW (MAX), coherence length: about 50 μm |
| Light source of displacement measurement system | LD (Laser Diode) Wavelength: 1.55 μm |
| Light receiving device | Ge photodiode Sensitivity (1.55 μm): 0.8 A/W |
| Reference mirror operation | Voice coil motor Maximum motion distance: 6 mm Operating frequency: 0-30 Hz Motion speed (30 Hz operating): <360 mm/s |

This system is based on the Michelson's interferometer and a specific feature thereof is that it uses optical fibers.

As shown in FIG. 3 and Table 1, the present system uses two 2×2 optical fiber couplers. One of them provides the light source with a low coherence ability and high luminosity and uses a SLD (Super Luminescent Diode) with a central wavelength of 1.55 μm and a coherence length of about 50 μm. Stability of this light source is ensured by conducting electric current control with a LD drive unit equipped with a temperature controller. The light falling from the (a) end of the optical fiber is split to the (b) end and (c) end, and the light irradiated from the collimator fibers of the (b) end is reflected by the front surface of each layer of the layered structure, boundary surfaces, or rear surfaces. Furthermore, the configuration is such that the light outgoing from the collimator fiber of the (c) end is reflected by the corner cube prism used as a reference mirror. The respective reflected lights are again combined in the optical fiber coupler 1, and an interference waveform is detected with a PD (Photo Detector) 1 using a Ge photodiode. Those components constitute a temperature measurement system for measuring changes in temperature occurring when the measurement sample is warmed with a heater.

Here, the fixed corner cube prism is driven back and forth with the voice coil motor employing a speaker drive principle, with a maximum displacement being 6 mm, in order to change the reference light optical path length. Thus using the voice coil motor makes it possible to measure a large depth with a high speed. Therefore, in terms of depth distance to the measurement sample and measurement speed, the degree of freedom in designing the system can be increased with respect to that of a piezoelectric element.

Another optical fiber coupler uses a LD (Laser Diode) with a central wavelength of 1.55 μm. Similarly, the light outgoing from the (b') end and (c') end is reflected by the corner cube prism and fixed mirror. The respective reflected lights are combined with a coupler 2 and detected with a PD 2 as an interference signal. Those components serve as a reference for the displacement of the above-mentioned voice coil motor and represent a mechanism for reading the displacement with a high accuracy. Therefore, they constitute a displacement measurement system.

The interference waveforms detected by the temperature measurement system and displacement measurement system are introduced into a personal computer by using a 12-bit A/D board with 0.5 Hz—maximum 500 kHz and the phase shift is studied with a program.

Using optical fibers in the above-described systems makes it possible to reduce the effect of the external stray light. Furthermore, the optical coupler fibers in the temperature measurement system and displacement measurement system in the above-described system are coated with a thermally insulating material in order to eliminate the effect of changes in temperature caused by the atmosphere or the like. Further, the heater and measurement sample are accommodated in a case lined with a thermally insulating material on the inner side. Thus, such constant temperature control of the system is very desirable for constantly maintaining the components other than the heater and measurement samples under identical conditions.

(Method for Measuring Temperature of a Layered Structure)

With the measurement method in accordance with the present invention, it is possible to measure the temperature not only of a substrate composed of a single material, but also the temperature of each layer in a substrate containing a plurality of material layers. The measurement principle in such a mode of the present invention will be described below.

(Temperature coefficient of Linear Thermal Expansion Coefficient and Changes in Refractive Index)

Temperature coefficient of linear thermal expansion coefficient and changes in the refractive index, which are the important parameters from the standpoint of conducting temperature measurement of layered structures, will be explained prior to describing the measurement method.

First, linear expansion will be considered. When a rod with a length $l_o$ at a temperature of 0° C. is heated to a temperature T° C., the length thereof is increased. Within a range in which the temperature is not too high, the increased length generally can be represented by the following formula:

$$l_T = l_o(1 + \alpha T + \alpha' T^2) \qquad (3\text{-}1)$$

Here, α, α' are the constants specific for the substance. In usual solid bodies, α is very small and α' assumes an even smaller value. In case T is small, the third term in the right side of equation (3-1) presented above can be ignored, and $l_T$ can be considered to be increasing proportionally to T, then the equation:

$$l_T = l_o(1 + \alpha T), \text{ or } \alpha = (1_T - l_o)/l_o T \qquad (3\text{-}2)$$

shows the ratio of expansion per unit length measured at 0° C. when the temperature increases by 1° C. within a range from 0° C. to T° C., and this ratio is called a linear expansion coefficient of the substance. Furthermore, in this case it can be assumed that the value of α does not change even if the temperature prior to expansion is not 0° C. For example, if $l_1$, $l_2$ denote the length of a rod at any temperature, $T_1$, $T_2$° C., then $$l_1 = l_o(1 + \alpha T_1) \text{ or } l_2 = l_o(1 + \alpha T_2) \qquad (3\text{-}3)$$

$$\therefore l_2 = l_1(1 + \alpha T_2)/(1 + \alpha T_1) = l_1(1 + \alpha T_2)(1 - \alpha T_1) \qquad (3\text{-}4)$$

If the temperature $T_1$, $T_2$ is not too high, then $$l_2 = l_1\{1 + \alpha(T_2 - T_1)\} \text{ or } \alpha = (l_2 - l_1)/l_1(T_2 - T_1) \qquad (3\text{-}5).$$

α can be determined from this equation.

However, when the third term in the right side of equation (3-1) cannot be ignored, α changes with temperature. Therefore, the linear expansion coefficient has to be considered for each temperature. If we assume that the rod with a length, l, at a temperature T° C. expands by Δl when the temperature rises by ΔT, then linear expansion coefficient $\alpha_T$ at temperature T° C. will be represented by the following formula.

$$\alpha_T = \lim_{\Delta T \to 0} \frac{\Delta l}{l \Delta T} = \frac{1}{l} \frac{\delta l}{\delta T} \qquad (3\text{-}6)$$

Within a temperature range from 0 to 100° C., it is not necessary to distinguish α and $\alpha_T$ for usual substances and any of them can be considered as representing the linear expansion coefficient of the substance.

The thickness of Si and $SiO_2$ samples used in this example wais 360 μm and 1 mm, respectively, and a temperature distribution obviously exists inside each of the substances. However, in multilayer structures, thermal conductivity is most often differs significantly between the layers and the difference in average temperature between the layers is larger than the difference representing temperature distribution in each layer. For this reason, in the present measurement method, the temperature distribution inside the substance is ignored and the temperature is assumed to be uniform. The expansion coefficient of Si has already been studied and expansion coefficients of Si at different temperatures have been found, as shown in FIG. 3-3 (J. A. McCaulley, V. M. Donnelly, M. Vernon, and I. Taha, "Temperature dependence of the near-infrared refractive index of silicon, gallium arsenide, and indium phosphide", Phy. Rev. B49, 7408, 1994).

Here, if the graph is approximated by a curve of second order in a range from 0° C. to 500° C., then $\alpha_{si}$ will be represented by the following formula (the above-mentioned publication by J. A. McCaulley et al.).

$$\alpha_{si} = -7.06 \times 10^{-11} \times T^2 + 6.83 \times 10^{-8} \times T + 2.38 \times 10^{-6} \qquad (3\text{-}7)$$

Furthermore, because presently there are no sufficient data for $SiO_2$, the linear expansion coefficient of $SiO_2$ will be approximated by a constant value as follows.

$$\alpha_{siO2} = 5 \times 10^{-7} \qquad (3\text{-}8)$$

Figure 6:
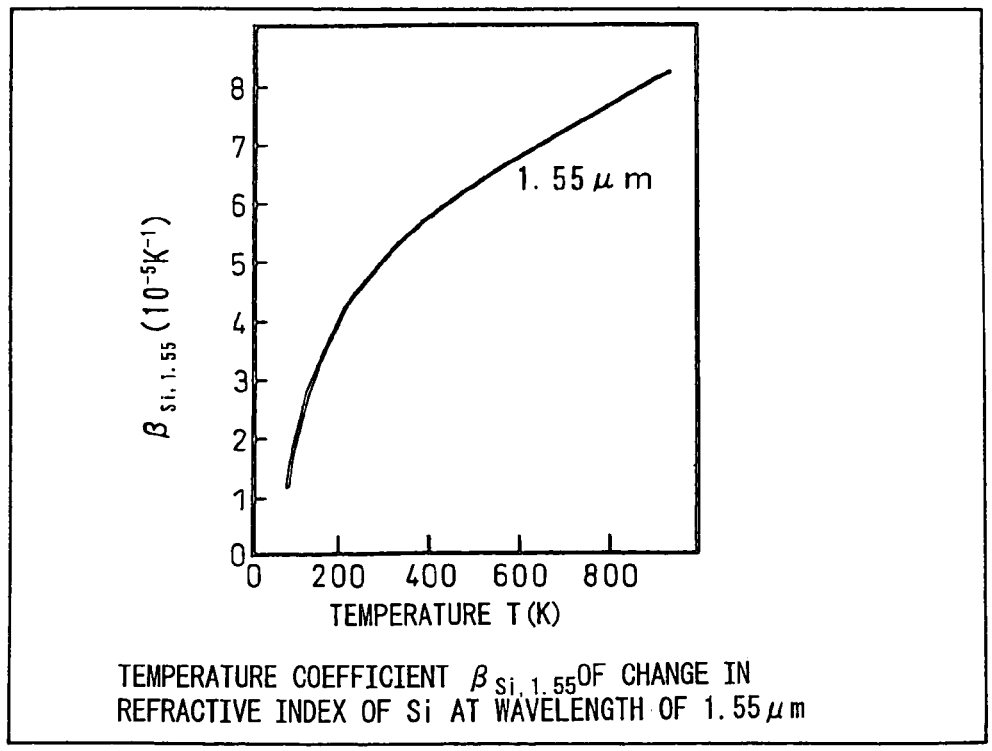
FIG. 6 is a graph illustrating the temperature coefficient of changes in the refractive index of Si at a wavelength of 1.55 μm.

Further, the temperature coefficient of changes in the refractive index is an example of one more factor causing a phase shift of the SLD interference waveform. Research relating to the temperature coefficient, β, of changes in the refractive index has been conducted. The results are shown by a graph in FIG. 6. This temperature coefficient is known to depend on a wavelength. The graph in FIG. 6 also shows that the value of β increases with the increase in temperature. Therefore, because the optical path length can be found as a product of refractive index and distance, it can become a reason why changes in temperature cause a shift in the peak of the SLD interference waveform.

If an approximation with a curve of second order is made for a temperature range from 0° C. to 500° C., similarly to the linear expansion coefficient, the temperature coefficient $\beta_{Si, 1.55}$ of changes in the refractive index of Si with respect to light with a wavelength of 1.55 μm can be given by the following formula (the above-mentioned publication by J. A. McCaulley et al.).

$$\beta_{Si,1.55} = -3.33 \times 10^{-11} \times T_2 + 6.76 \times 10^{-8} \times T + 5.01 \times 10^{-5} \quad (3\text{-}9)$$

(Method for Measuring Temperature)

A measurement method relating to Si and $SiO_2$ shown in FIG. 7 as measurement objects will be described below. An interference waveform from the reflected light from the front surface and rear surface of each layer and the reference light is obtained by driving the reference mirror back and forth with a voice coil motor.

Figure 7:
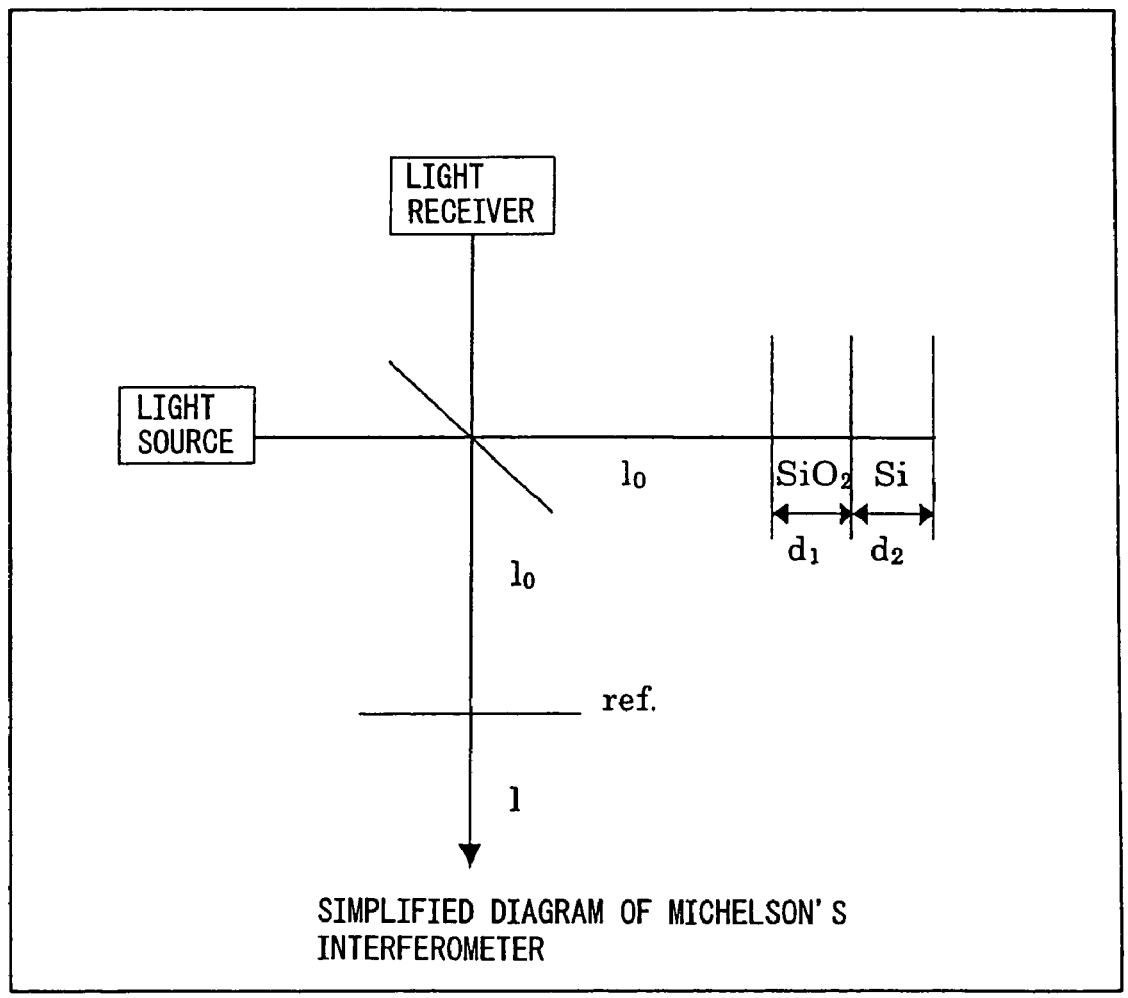
FIG. 7 is a schematic diagram illustrating the configuration of a Michelson's interferometer.

Referring to FIG. 7, the distance to the surface of $SiO_2$ and reference mirror in case the voice coil motor is in a standard position will be considered the same. Refractive indexes of Si and $SiO_2$ prior to changes in temperature will be denoted by $n_{Si}$ and $n_{SiO2}$ and the respective thicknesses will be denoted by $d_{Si}$ and $d_{SiO2}$. In this case, the optical path length of the light passing through $SiO_2$ can be represented by the following formula $$l_{SiO2} = n_{SiO2} \cdot d_{SiO2} \quad (3\text{-}10)$$

If the temperature of $SiO_2$ changes by $\Delta T_1$ under the effect of the heater, then the refractive index changes as represented by the following formula under the effect of temperature coefficient $\beta_{SiO2}$ of changes in the refractive index, which depend on the wavelength, and the thickness changes as represented by the following formula under the effect of expansion coefficient $\alpha_{SiO2}$.

$$n_{SiO2} \rightarrow n_{SiO2}(1 + \beta_{SiO2} \Delta T_1) \quad (3\text{-}11)$$

$$d_{SiO2} \rightarrow d_{SiO2}(1 + \alpha_{SiO2} \Delta T_1) \quad (3\text{-}12)$$

Therefore, the optical path length after the changes in temperature becomes $$l'_{SiO2} = n_{SiO2}(1 + \beta_{SiO2} \Delta T) \cdot d_{SiO2}(1 + \alpha_{SiO2} \Delta T) \quad (3\text{-}13).$$

If the difference between the result obtained before the changes in temperature and after the changes in temperature is found, then from $\alpha_{SiO2} \cdot \beta_{SiO2} \ll \alpha_{SiO2}, \beta_{SiO2}$, the following can be obtained.

$$l'_{SiO2} - l_{SiO2} = n_{SiO2} \cdot d_{SiO2}(\alpha_{SiO2} + \beta_{SiO2}) \Delta T_1 \quad (3\text{-}14)$$

Thus, changes in temperature $\Delta T_1$ can be found by examining in advance the temperature coefficient $\beta_{SiO2}$ of changes in the refractive index and linear expansion coefficient $\alpha_{SiO2}$ in $SiO_2$.

Similarly, changes in temperature can be found for Si by examining $\alpha_{Si}$ and $\beta_{Si}$.

(Method for Finding Changes in Temperature from Interference Waveform)

A method for finding changes in temperature from the interference waveform detected with the present system will be described. The explanation will be conducted with respect to Si as an example of the measurement material.

Figure 8:
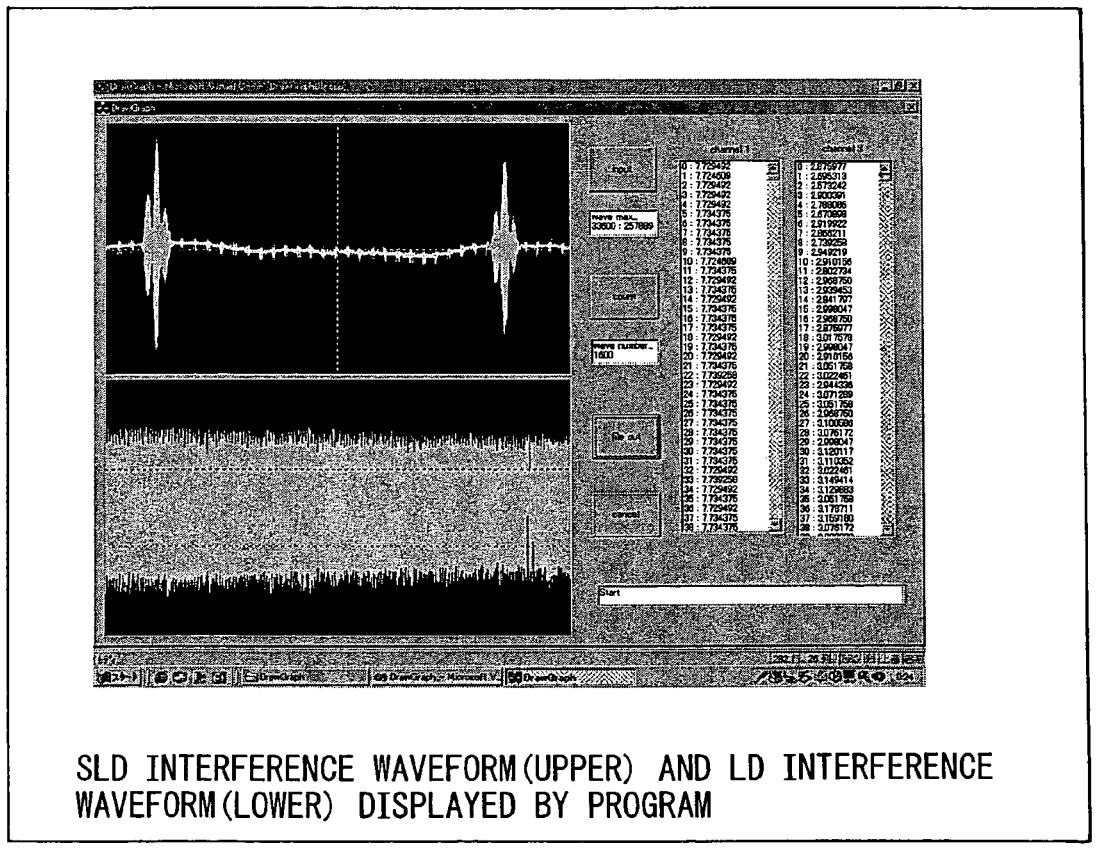
FIG. 8 illustrates an SLD interference waveform and LD interference waveform drawn by a program.

FIG. 8 shows an image including the SLD interference waveform obtained with the temperature measurement system according to a program and the LD interference waveform from the displacement image system. The reflected lights from the front surface of Si and rear surface of Si and the reflected light from the corner cube prism interfere and the interference waveform shown in FIG. 8 is obtained.

As shown in FIG. 8, two peaks can be observed in the SLD interference waveform, but the left and right peaks clearly have different size. This is because normally incident lights are reflected on the boundary surface of substances with different refractive indexes $n_1$, $n_2$. Here, the reflection factor of the light at the boundary surface can be given by the following equation.

$$\rho = \frac{n_1 - n_2}{n_1 + n_2} \quad (3\text{-}15)$$

Therefore, the reflected light intensity R becomes $$R = |\rho|^2 = \left|\frac{n_1 - n_2}{n_1 + n_2}\right|^2 \quad (3\text{-}16)$$

The first interference peak is formed by the light reflected from the front surface of Si. On the other hand, the quantity of light transmitted through the front surface of Si is reduced by the light absorption quantity inside the Si and the quantity of reflected light, and the light that was transmitted through the front surface undergoes reflection on the rear surface of Si. As a result, a difference appears between the right and left peaks of the SLD interference waveform. Those two peaks are detected according to the program and the positions thereof are stored in a memory. The wave number between the two points of the peaks and the phase shift at both ends are then read out with respect to the LD interference waveform which is a standard. Changes in temperature are then derived from the aforementioned equation (3-14) by acquiring the interference waveforms before and after changes in temperature as described hereinabove and investigating the wave number of the LD interference waveform between two peaks of the SLD interference waveform.

(Several Usual Methods for Measuring Temperature)

1) In accordance with the present invention, the value that can be directly measured by the interference waveform of the optical system is (n·d) (n is a refractive index, d is a film thickness).

(Measurement Method—1)

In temperature measurements or a substrate treatment apparatus for electronic devices, the temperature control of the sample is conduced in a load-lock chamber, or a measurement chamber, or an OFF-System (separate system) and $(\alpha + \beta)_m$ is measured at several temperatures $T_m$ (including a process temperature $T_p$). The following formula can be thus obtained.

$$(n_{m+1} \cdot d_{m+1}) - (n_m \cdot d_m) = (n_m \cdot d_m)(\alpha + \beta)_m (T_{m+1} - T_m) \text{ and then,}$$

$$(\alpha + \beta)_m = \frac{(n_{m+1} \cdot d_{m+1}) - (n_m \cdot d_m)}{(n_m \cdot d_m)(T_{m+1} - T_m)}.$$

Here, $(\alpha + \beta)_p$ is the temperature coefficient at the initial temperature of the susceptor during the process (it is preferred that the temperature control of the susceptor be freely conducted).

The sample is then transferred onto the susceptor present in the treatment chamber and a measurement value $(n_t \cdot d_t)$ at a transition temperature of the sample is obtained. If the difference with $(n_p \cdot d_p)$ that was determined in advance is within a certain range, the process is started. A process start signal is outputted.

If the process is started, $(n_x \cdot d_x)$ is measured. Initially, $T_x$ is not known. therefore, $T_x$ is calculated in the following manner by using $(\alpha+\beta)_p$ at the process temperature $T_p$.

$$(n_x \cdot d_x) - (n_p \cdot d_p) = (n_p \cdot d_p)(\alpha + \beta)_p (T_x - T_p),$$

$$T_x = \frac{(n_x \cdot d_x) - (n_p \cdot d_p)}{(n_p \cdot d_p)(\alpha + \beta)_p} + T_p$$

From the next measurement cycle, the measured value of the optical path length at this point in time is anew considered as $(n_x \cdot d_x)$ under an assumption that $T_x \equiv T_m'$. At this time, the temperature to be measured anew, is denoted by $T_x$ and calculated in the following manner by replacing with the values $T_m$, $(\alpha+\beta)_m$ measured in a temperature zone including, for example, $T_m'$ from the data representing the temperature dependence of $(\alpha+\beta)$ for which $(\alpha+\beta)_m'$ at the temperature $T_m'$ were measured in advance.

$$(n_x \cdot d_x) - (n_m \cdot d_m) = (n_m \cdot d_m)(\alpha + \beta)_m (T_x - T_m)$$

$$T_x = \frac{(n_x \cdot d_x) - (n_m \cdot d_m)}{(n_m \cdot d_m)(\alpha + \beta)_m} + T_m$$

The temperature of each layer can be then measured by repeating this operation.

In order to simplify calculations, all the $T_x$ may be computed by using the $(\alpha+\beta)_p$. Alternatively, when $T_m > T_p$, all the $T_x$ may be computed by employing the arithmetic average value of $(\alpha+\beta)_m$ as $(\alpha+\beta)_m'$.

(Measurement Method—2)

$(n_r \cdot d_r)$ is measured at room temperature $T_r$ in the load-lock chamber, or measurement chamber, or OFF-System.

The temperature coefficient $(\alpha+\beta)_r$ is calculated in the following manner from the above-described measured values.

The sample is then transferred onto the susceptor located inside the treatment chamber and $(n_p \cdot d_p)$ is measured at the temperature $T_p$ after the temperature becomes constant.

The following result is obtained.

$$(n_p \cdot d_p) - (n_r \cdot d_r) = (n_r \cdot d_r)(\alpha + \beta)_r (T_p - T_r)$$

$$(\alpha + \beta)_r = \frac{(n_p \cdot d_p) - (n_r \cdot d_r)}{(n_r \cdot d_r)(T_p - T_r)}$$

The process is then started.

If the process is started, $(n_x \cdot d_x)$ is measured and the temperature $T_x$ is calculated in the following manner by using the above-described $(\alpha+\beta)_r$.

$$(n_x \cdot d_x) - (n_p \cdot d_p) = (n_p \cdot d_p)(\alpha + \beta)_r (T_x - T_p)$$

$$T_x = \frac{(n_x \cdot d_x) - (n_p \cdot d_p)}{(n_p \cdot d_p)(\alpha + \beta)_r} + T_p$$

(Measurement of Temperature of the Outermost Layer During Process Execution)

(1) In case of a heat treatment process, the shape of the outermost surface is not changed. Therefore, the measurements can be conducted by the usual measurement method.

(2) In case of an etching process, the temperature of the outermost layer can be measured by the usual measurement method by processing and measuring the interference wavelength determined by the reflected light from the layer below the mask.

For example, the etching rate can be calculated by the following formula after measuring the interference wavelength determined by the reflected light from the region which is being etched, if the temperature is considered to be equal to the temperature below the aforementioned mask.

$$\text{Etching rate} = \frac{(n_p \cdot d_p) - (n_x \cdot d_x)}{t_x}$$

($t_x$ is elapsed time)

Further, the end signal (end point) of the process can be obtained with $(n_x \cdot d_x) = \phi$. Alternatively, the process can be ended.

The etching depth and etching rate can be computed.

$$\text{Etching depth} = \frac{(n_p \cdot d_p) - (n_x \cdot d_x)}{n_p}$$

$$\text{Etching rate} = \frac{(n_p \cdot d_p) - (n_x \cdot d_x)}{n_p \cdot t}$$

$(n_p \cdot d_p)$ is the optical path length below the mask.

$(n_x \cdot d_x)$ is the optical path length of the region which is being etched.

(3) In the case of a film deposition process, several physical properties are obtained in advance at a temperature close to the process temperature from a sample subjected to film deposition, by using light with two wavelengths: a wavelength $\lambda_1$ at which the changes in the refractive index caused by temperature are large and a wavelength $\lambda_2$ at which the changes in the refractive index are small.

In the process, the optical path lengths $(n_{\lambda 1} \cdot d_{\lambda 0 1})$, $(n_{\lambda 2} \cdot d_{\lambda 2})$ corresponding to respective two wavelengths are measured and the temperature is computed from the aforementioned physical properties that were found in advance.

(Preferred Measurement Method—1) Example of a Method for Measuring Temperature and Film Thickness During Film Deposition In this case, the measurements can be conducted by using two wavelengths in a low-coherence interferometer. In this case, the light source means may preferably comprise two light sources, one of which has a wavelength providing a relatively large temperature coefficient of change in refractive index of the substrate, and the other of which has a wavelength providing a relatively small coefficient of temperature change in the refractive index of the substrate.

For example, when silicon is deposited on glass, a LED or SLD with a wavelength close to 980 nm ($\lambda 1$), at which the temperature-induced changes in the refractive index are large, is preferably used. At $\lambda 1$, changes in the spacing between the interference peaks of the front surface and rear surface of a silicon layer with respect to those at the initial temperature are measured as changes in the optical path length $n1 d(\alpha+\beta 1)\Delta T$. Then, they are similarly measured as $n2 d(\alpha+\beta 2)\Delta T$ at a wavelength close to 1.5 μm. ΔT is considered as the change in temperature from the initial temperature. The changes, β2, in the refractive index caused by temperature at a wavelength close to 1.5 μm are less than β1 by more than an order of magnitude, as can be judged by the absorption characteristic. If the ratio is taken, then n1 (α+β1)/n2 (α+β2) is obtained and d is eliminated. The dependence of this ratio on temperature is measured in advance and the temperature is calculated.

If the dependence of n1 on temperature is found in advance with the OFF•System by the method described in "Optical Technology", p. 305-330, Lecture 6 on Experimental Physics, published by Kyoritsu Shuppan Co., then when the temperature $T_x$ is calculated as described hereinabove (for example, in the form of a table), then the $n1_x$ corresponding thereto can be inversely calculated, for example, from the table, and the following expression can be obtained.

$$d = \frac{(nlx \cdot d)}{nl_x}$$

($n1_x \cdot d$) is the measured value.

(Measurement Method—2)

n1 depends on temperature with respect to $\lambda_1$ close to process temperature $T_p$, but n2 is almost constant with respect to $\lambda_2$.

* Physical values are measured in advance with the OFF•System, while conducting temperature control of materials after film deposition. For example, close to the initial process temperature $T_p$, $n1_p$ with respect to wavelength $\lambda_1$, n2 with respect to α+β1 wavelength $\lambda_2$, α+β2 (β2≈φ).

A method for measuring the refractive index is described, for example, in "Optical Technology", p. 305-330, Lecture 6 on Experimental Physics, published by Kyoritsu Shuppan Co.

The sample is transferred onto a susceptor located in the treatment chamber, and after the process is started, the optical path length ($n2_x \cdot d_x$) at the time of temperature $T_x$ is measured at the wavelength $\lambda_2$ at which "the above-described method can be used for the process start timing", and because n2x≈n2 (β2≈φ), the following can be obtained.

$$d_x = \frac{(n2_x \cdot d_x)}{n2}$$

At wavelength $\lambda_1$, from the formula describing changes in the optical path, and by using the already known physical values, the temperature $T_x$ can be calculated in the following manner.

$$(n1_x \cdot d_x) - (n1_p \cdot d_p) = (n1_p \cdot d_p)(\alpha + \beta 1)(T_x - T_p)$$

$$T_x = \frac{(n1_x \cdot d_x) - (n1_p \cdot d_p)}{(n1_p \cdot d_p)(\alpha + \beta 1)} + T_p$$

Here, $n1_p$, (α+β1) were measured in advance, $T_p$ is already known, $d_p = d_x$.

Alternatively, the dependence of $n1_m$ on temperature is represented in advance in the form of a table by using wavelength $\lambda_1$, the optical path length ($n_x \cdot d_x$) is measured in the course of the process, and the following can be obtained at $\lambda_2$:

$$d_x = \frac{(n2_x \cdot d_x)}{n2}$$

At $\lambda_1$, the following can be obtained:

$$n1_x = \frac{(n1_x \cdot d_x)}{d_x}$$

The temperature at the time of $n1_x$ can be calculated by using inversely the aforementioned table. 30 nm, $\lambda_2$≈1.5 μm (when the front surface layer is a deposited Si film).

(In the Case of Film Deposition Process)

For example, the interference intensity ratio of the low-coherence interferometer can be used. An example in which a two-layer substrate composed of glass and silicon is used for measurements will be considered below. Usually, when the substrate does not absorb in the layer where measurements are conducted, the reflection intensity $\{|n^{Si}-n_{Vac}|/\{|n_{Si}+n_{Vac}|\}^2$ is simply determined from the refractive index at each boundary. If a wavelength of an order of 1 μm is used, the light is absorbed. Therefore, the quantity of the light reflected from the silicon -surface is decreased by the absorbed amount and is equal to $\{|n_{Si}-n_{Vac}|/\{|n_{Si}+n_{Vac}|\}^2$ exp(-a2d) (a is an absorption coefficient, d is a film thickness).

The quantity of light reflected from the boundary surface of silicon and glass does not pass through the silicon layer and therefore becomes: $\{|n_{Si}-n_g|/\{n_{Si}+n_g|\}^2$.

As for the changes in the optical path length caused by low-coherence interferometer during deposition, changes in the phase caused by changes in d are usually larger than those caused by changes in n. Therefore, for the sake of convenience, d is found by assuming that n is constant, changes in a caused by changes in temperature are measured in advance, and temperature is calculated from the decrease in the quantity of the reflected light.

A method for measuring a is described in "FT-IR Basics and Applications", p 4 year published by Tokyo Kagaku Dojin Co., Ltd. or in "Optical Technology", p. 323-330, Lecture 6 on Experimental Physics, published by Kyoritsu Shuppan Co.

5) New signal from measurements during film deposition process. The following procedure may be employed when $d_x$ has been measured by the above-described method.

a) When there is a target thickness, the end signal of the film deposition process can be outputted.

Alternatively, the process can be ended.

b) Film deposition rate=dx/t (t is elapsed time)

(Example of Configuration of Film Thickness and Temperature Sensor)

Figure 22:
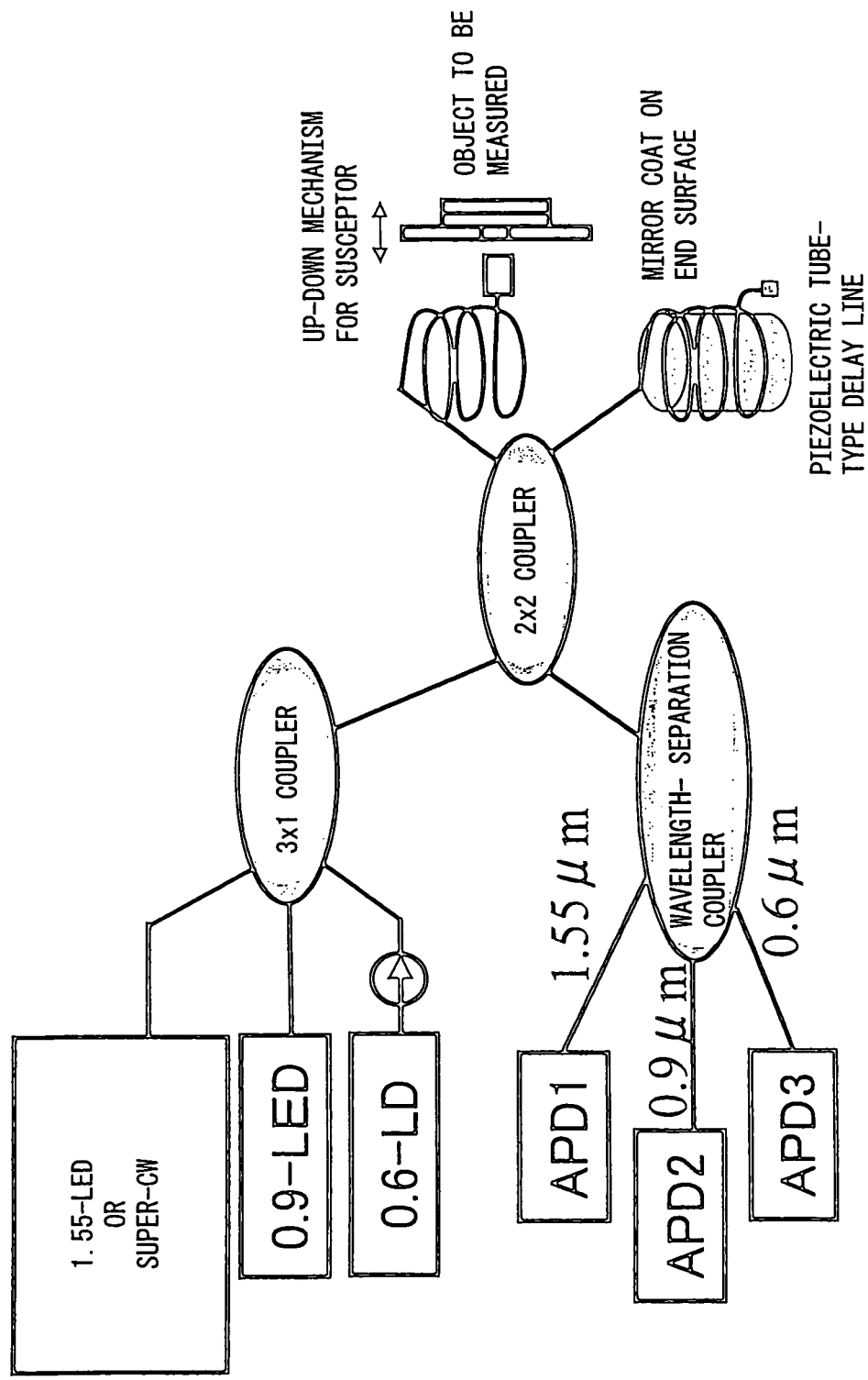
FIG. 22 is a block diagram illustrating another mode of the apparatus for measuring temperature in accordance with the present invention.

FIG. 22 is a block diagram illustrating an example of configuration of the other apparatus for measuring temperature in accordance with the present invention. The difference between the apparatus shown in FIG. 22 and that shown in FIG. 3 is in that a combination of a delay line of a piezoelectric tube type, 3×1 coupler, and wavelength separation coupler 2×2 coupler is used. With such an example illustrated by FIG. 22, the entire optical system is equipped with optical fibers. Furthermore, the reference optical path is almost equal to the optical path for temperature measurement. The resultant advantage that can be obtained is that the system is extremely stable with respect to disturbances such as vibrations and changes in the external temperature.

An example of the apparatus for measuring temperature or thickness according to this embodiment, may preferably comprise: light source means for irradiating with light the front surface or rear surface of a substrate whose temperature or thickness is to be measured; a splitter for splitting the light into a reference light and a measurement light; reference light reflecting means for reflecting the reference light; optical path changing means for changing the optical path length of light reflected from the reference light reflecting means; and light receiving means for measuring the interference of the reflected light from the substrate and the reference light from the reference light reflecting means, wherein the temperature or thickness of the front surface, rear surface and/or inside of the substrate is measured based on the measurement of the interference;

wherein the light source means comprises: one light source or two light sources having different wavelengths, for measuring the temperature or thickness of the substrate; and a displacement-measuring light source for measuring the displacement in the optical path changing means; and the light receiving means comprises: one or two light-receiving devices corresponding to the one or two light sources, for receiving the interference light based on the light from the one or two light sources, which has been reflected from the substrate and the reference light reflecting means; and a displacement-measuring light-receiving device for receiving the interference light based on the light from the displacement-measuring light source, which has been reflected from the substrate and the reference light reflecting means.

In this apparatus the light source for measuring the temperature or thickness of the substrate may preferably have a wavelength of 0.3-20 µm, and a coherence length of 0.1-100 µm.

In this apparatus the light source means may preferably comprise two light sources, one of which has a wavelength providing a relatively large temperature coefficient of change in refractive index of the substrate, and the other of which has a wavelength providing a relatively small coefficient of temperature change in the refractive index of the substrate.

(Process Control Based on Temperature Measurements)

The mode of using the above-described method and apparatus for measuring temperature in accordance with the present invention is not limited to the method and apparatus for treating substrates for devices. For example, when the method and apparatus for measuring temperature in accordance with the present invention is used for APC treatment (Advanced Process Control), for example, the temperature data obtained with the above-described apparatus (optical circuit) for measuring temperature in accordance with the present invention can be statistically processed and process control can be conducted based on the results obtained. In such a process control, various process parameters (for example, total flow rate of gas, gas flow rate ratio, gas pressure, susceptor temperature, temperature of the front surface of the substrate, plasma-generating power, bias power, and $V_{dc}, V_{pp}$) can be monitored and if those parameters are within the allowed range, "GOOD" or "OK" signal can be outputted.

If some of the parameters are outside the allowed range, an alarm signal "SUBSTRATE FOR DEVICE (FOR EXAMPLE, WAFER) HAS TO BE EXAMINED AGAIN" is generated and/or an alarm signal "INITIALIZATION OR RESET OF TREATMENT SYSTEM IS REQUIRED" is generated.

Figure 23:
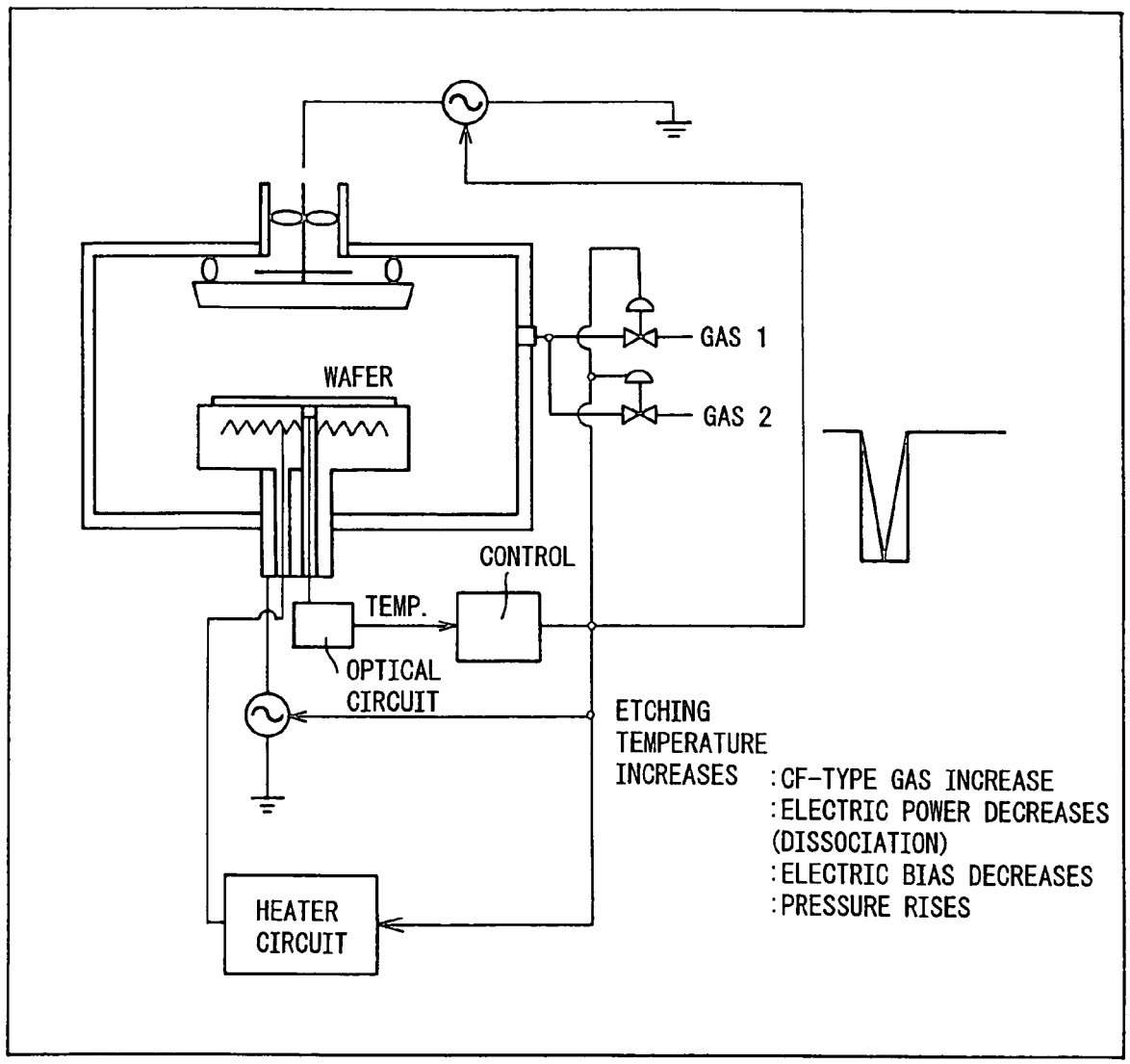
FIG. 23 is a schematic cross-sectional view illustrating an example of employing the apparatus for measuring temperature in accordance with the present invention in an electronic device treatment apparatus.
Figure 24:
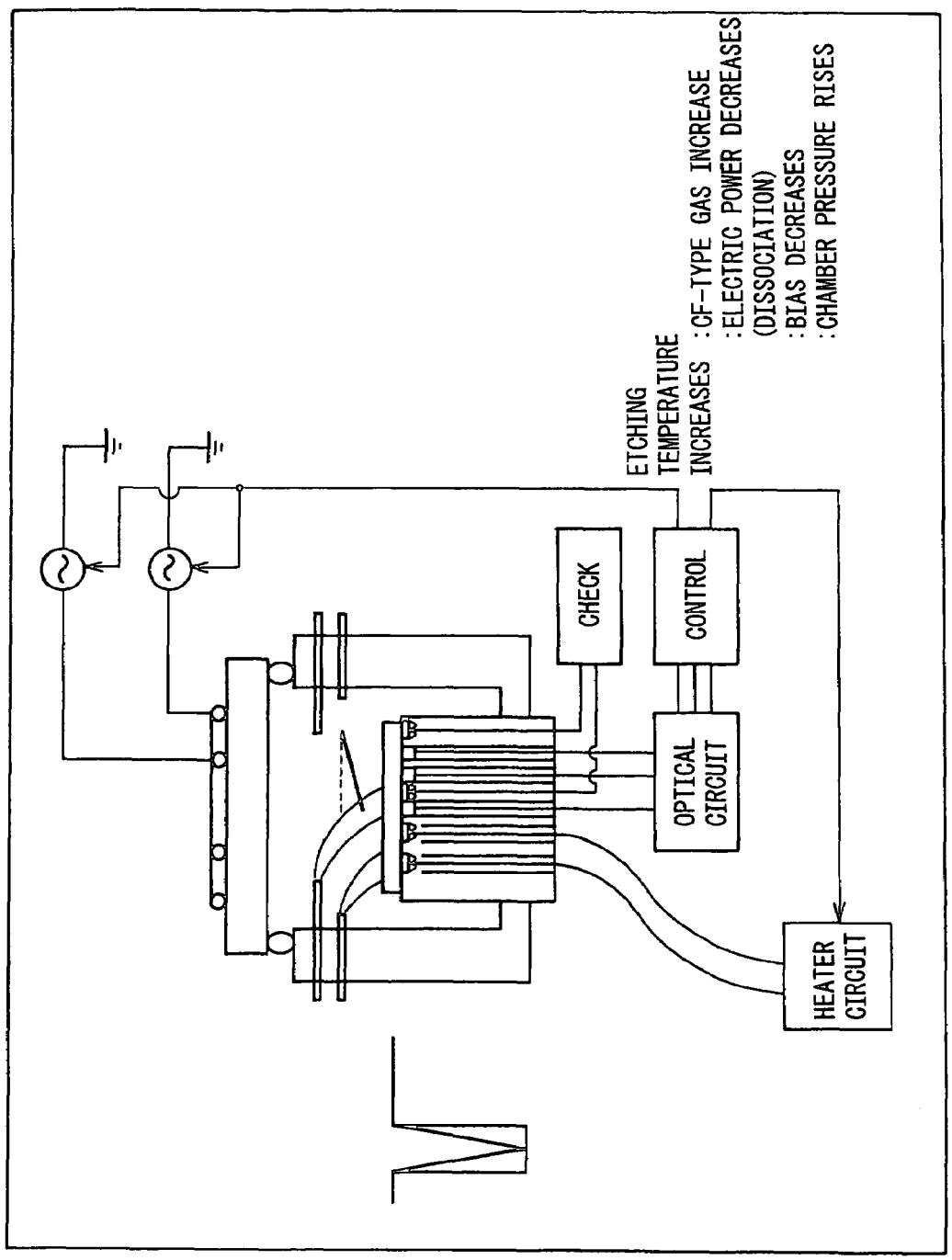
FIG. 24 is a schematic cross-sectional view illustrating an example of employing the apparatus for measuring temperature in accordance with the present invention in an electronic device treatment apparatus.

(Example of application to etching) An example in which the above-described method for measuring temperature in accordance with the present invention is applied to an apparatus for treating substrates for devices by using etching is shown in FIG. 23 and FIG. 24.

FIG. 23 shows an example of controlling a gas flow rate or the like based on the temperature data (single point of the substrate) obtained by measuring temperature in accordance with the present invention. In this case, for example, when the temperature of the front surface or inside the substrate for a device, which is to be treated, rises and the adhesion coefficient of gas molecules contributing to etching decreases, a variety of process parameters can be controlled so as to increase the flow rate of etching gas (for example, fluorocarbon gas), decrease the power (dissociation), decrease the bias, and/or increase the pressure.

FIG. 24 shows an example of controlling a gas flow rate and the like based on the temperature data (multiple points on the substrate; temperature distribution) obtained by measuring the temperature in accordance with the present invention. In this case, for example, the above-described various process parameters of the substrate components corresponding to the measurement points can be controlled based on the temperature measurement data obtained in each point.

For example, when the ambient temperature increased, a uniform substrate temperature is obtained by conducting zone control of the attraction force of an electrostatic chuck or zone control of susceptor temperature, or by increasing the flow rate ratio of the etching gas on the periphery or decreasing the plasma-generating power on the periphery.

(Example of Application to Film Deposition)

Figure 25:
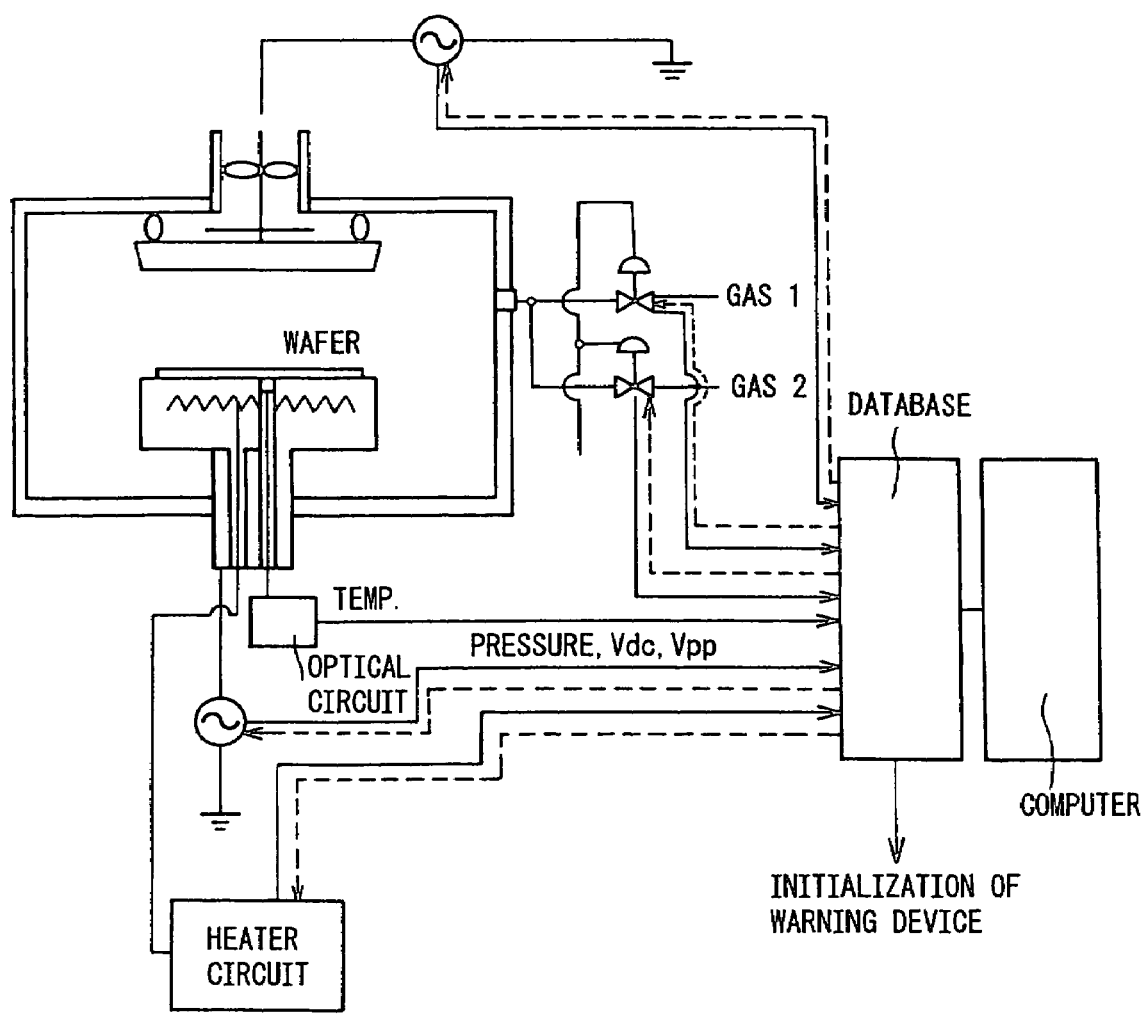
FIG. 25 is a schematic cross-sectional view illustrating another example of employing the apparatus for measuring temperature in accordance with the present invention in an electronic device treatment apparatus.
Figure 26:
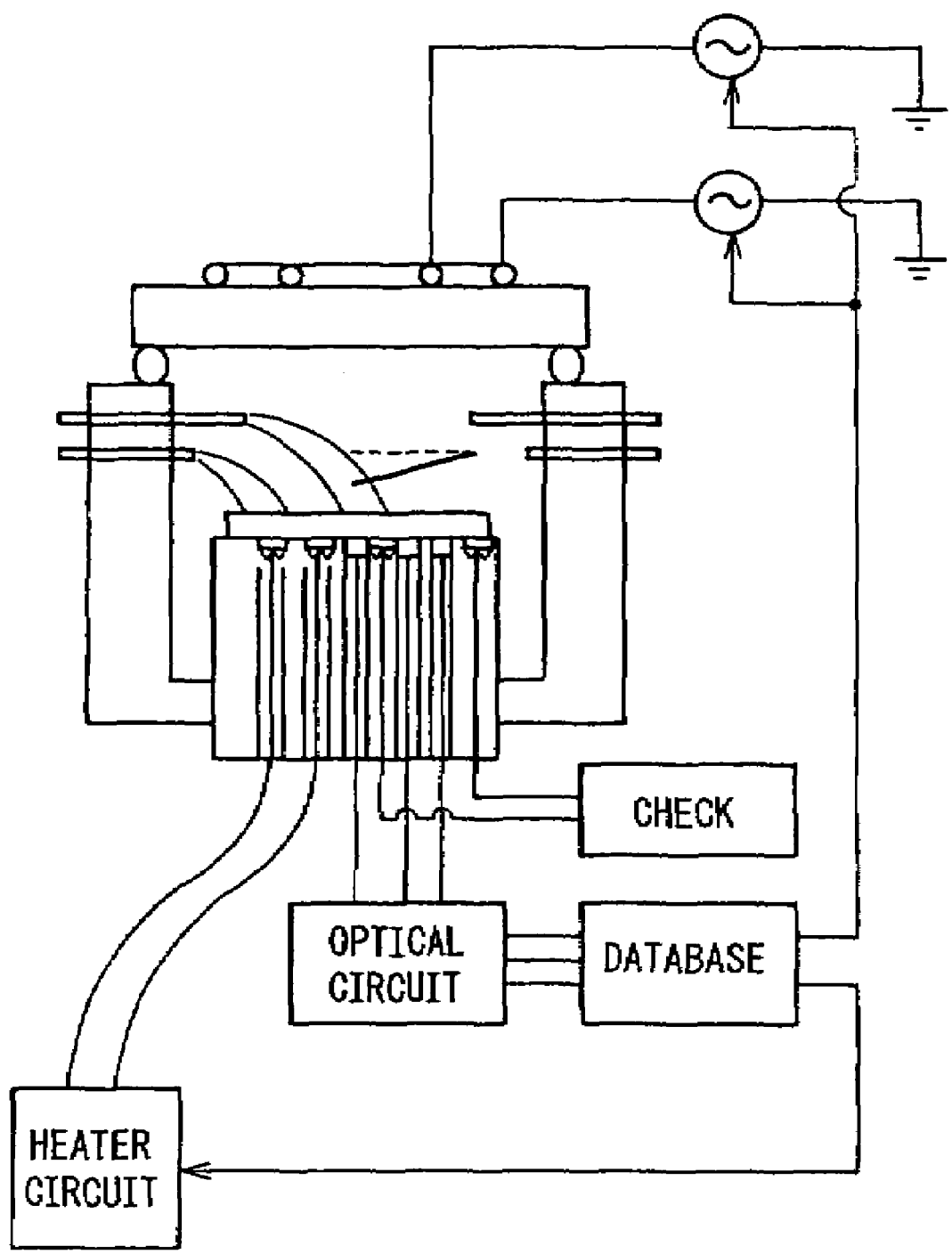
FIG. 26 is a schematic cross-sectional view illustrating another example of employing the apparatus for measuring temperature in accordance with the present invention in an electronic device treatment apparatus.

An example of using the above-described method for measuring temperature in accordance with the present invention in the apparatus for treating substrates for devices by using a film deposition process is shown in FIG. 25 and FIG. 26.

FIG. 25 shows an example of controlling the flow rate of the gas for film deposition based on the temperature data (single point of a substrate) obtained by measuring temperature in accordance with the present invention. In this case, for example, when the temperature on the surface and inside the substrate for a device, which is to be treated, rises and the separation of the film formation precursor from the surface becomes significant, various process parameters can be controlled so as to increase the flow rate of the gas for film deposition (for example, flow rate of Si), decrease power (ionization), decrease bias, and/or increase the pressure.

FIG. 26 illustrates an example of controlling the flow rate of the gas for film deposition based on the temperature data (multiple points of a substrate; temperature distribution) obtained by measuring temperature in accordance with the present invention. In this case, for example, various above-described process parameters can be controlled for a substrate portion corresponding to the measurement points, based on the temperature measurement data for each point.

For example, when the temperature rises in the central portion, a uniform temperature distribution in the substrate is obtained by using a zone control function of the electrostatic chuck for the susceptor temperature. Alternatively, a uniform distribution of film deposition rate is obtained by conducting control, for example, such that increases the flow rate ratio of the gas for film deposition in the central portion.

(Mode in which a Substrate is Irradiated with a Plurality of Lights)

In accordance with the present invention, when temperature is measured by using the low-coherence interferometer, the optical path length (refractive index×thickness) of the substrate may be obtained from the reference mirror drive distance and converted to temperature. This mode may have an advantage in that it is not necessary to obtain the optical path length at a certain temperature (an initial thickness) in advance.

In this mode, it may be preferred to irradiate the substrate with light of a plurality of wavelengths so as to obtain the optical path lengths for each wavelength. By calculating the ratio between these optical path lengths thus measured, the thickness of the substrate can be canceled and the refractive index ratio can be converted to temperature. (With regard to such conversion to temperature, an article in J. Phys. Chem. Ref. Data., Vol. 9, No. 3 (1980) pp. 561-658 may be referenced as needed.) Therefore, in this mode, the temperature can be obtained from the variation in the refractive index independently of the thickness of the substrate.

Generally, in the thermometer using the low-coherence light interferometer, the temperature dependence of the thickness and refractive index of the substrate may be employed to obtain the temperature from the movement distance of the reference mirror and, thus, the optical path length (=refractive index×thickness). However, in this method, if the optical path length at a certain temperature (the initial thickness) is not known, the temperature may not be obtained directly from the optical path length.

In contrast, in this mode, such problem can be solved by determining the optical path lengths for a plurality of wavelengths.

(Example of Apparatus Configuration for Measuring Temperature)

Figure 27:
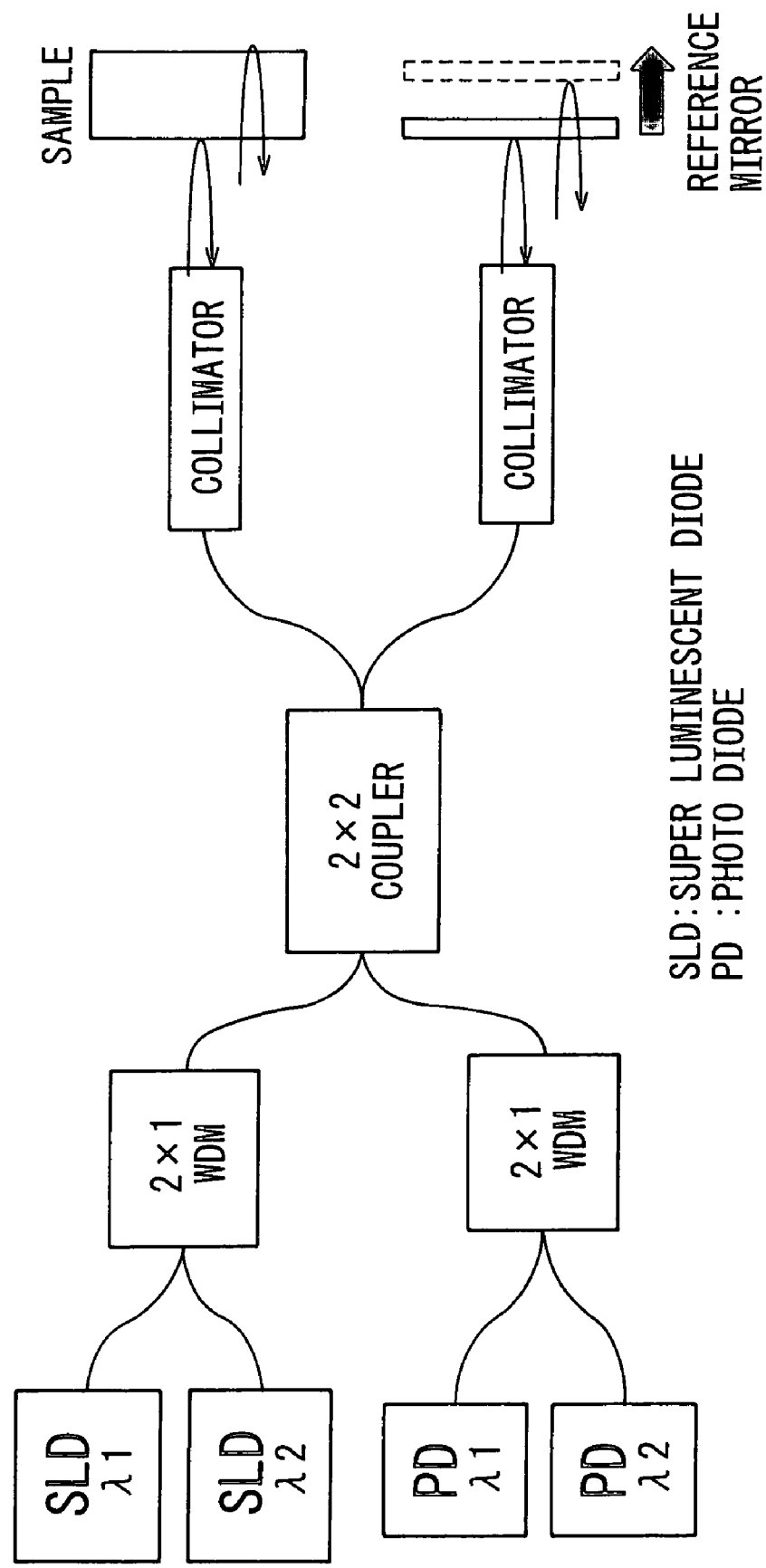
FIG. 27 is a block diagram illustrating an example of another mode of an apparatus for measuring temperature (an example of using a plurality of wavelengths) in accordance with the present invention.

FIG. 27 shows a block diagram of another example of an apparatus for measuring temperature that may be used in this mode. The apparatus for measuring temperature in FIG. 27 is configured similarly to that in FIG. 3 except for the followings:

(1) Two 2×1 WDM (Wavelength Division Multiplexers) are used, wherein one of the WDM is connected with an SLD (Super Luminescent Diode) with a wavelength λ1 and an SLD with a wavelength λ2 and the other of the WDM is connected with a PD (Photo Detector) with the wavelength λ1 and a PD with the wavelength λ2; and (2) Further, both the WDM are connected to one end of a 2×2 coupler, the other end of which is connected with a sample and a reference mirror via two respective collimators.

(Example of Method for Measuring Temperature)

When the apparatus configuration of FIG. 27 described above is used, for example, the temperature may be measured as follows. (Here, with regard to the detail of the apparatus configuration of FIG. 27, a specification of Japanese Patent Application No. 2005-32223 filed on Feb. 8, 2005 may be referenced as needed.)

Thus, an interferometer as shown in FIG. 27 is constructed so that optical path lengths L1 (T) and L2 (T) may be obtained for two light sources of λ1 and λ2, respectively. Assuming that the refractive index of the substrate at a temperature T is n1 (T) and n2 (T) for λ1 and λ2, respectively, the following equations can hold:

$$L1(T)=n1(T)d(T)$$

$$L2(T)=n2(T)d(T)$$

The ratio between them can be represented as follows:

$$L1(T)/L2(T)=n1(T)/n2(T)$$

Therefore, the ratio between them (L1 (T)/L2 (T)) does not depend on the thickness of the substrate but depends only on the refractive index. Because the refractive index is a value that is unique to each material, temperature can be obtained regardless of the difference of the thickness of the substrate.

(Simulation)

Figure 28:
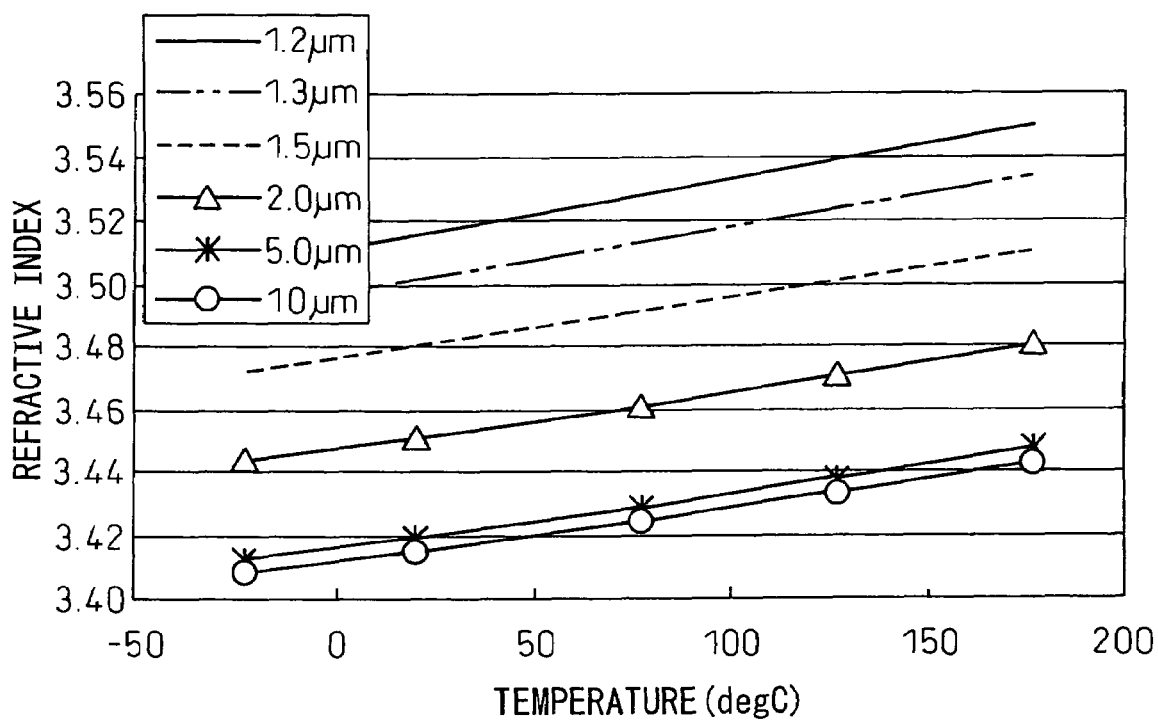
FIG. 28 is a graph illustrating an example of the relationship between the refractive index of the silicon substrate and the temperature at various wavelengths.
Figure 29:
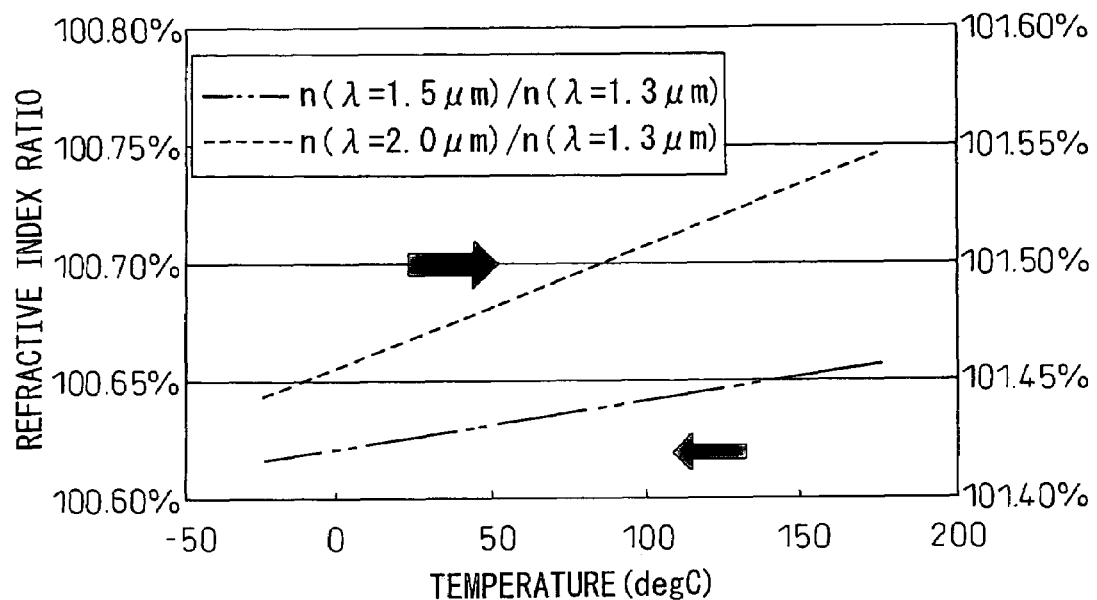
FIG. 29 is a graph illustrating an example of the relationship between the refractive index ratio of the silicon substrate and the temperature at various wavelengths.
Figure 30:
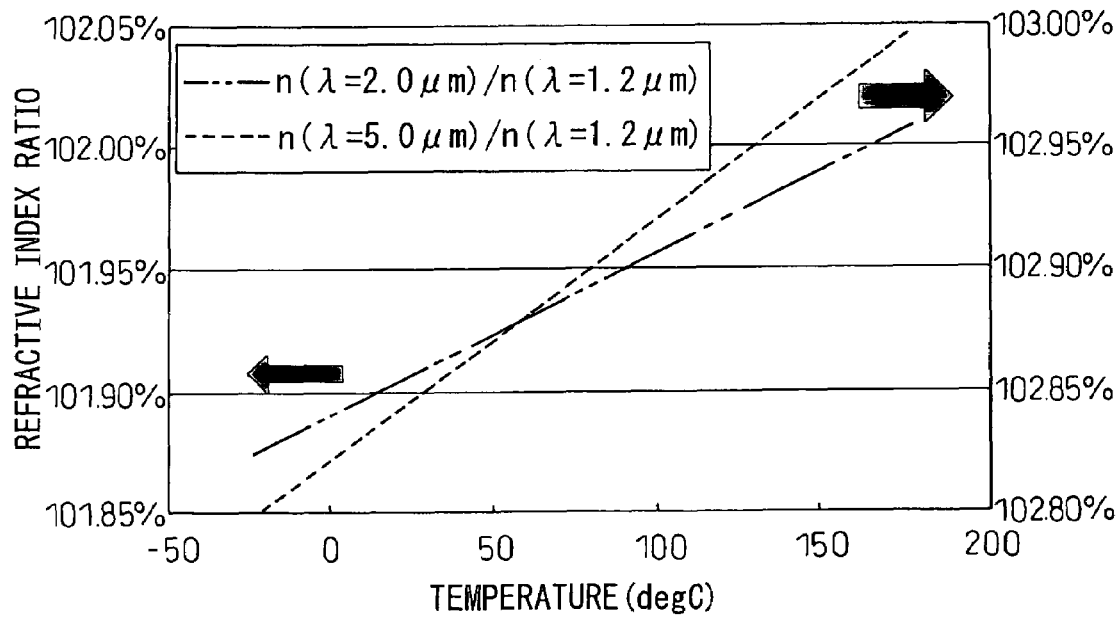
FIG. 30 is a graph illustrating another example of the relationship between the refractive index ratio of the silicon substrate and the temperature at various wavelengths.

For example, with regard to light with wavelengths of 1.2 μm, 1.3 μm, 1.5 μm, 2.0 μm, 5.0 μm, and 10 μm, the refractive index of Si varies with temperature as shown in FIG. 28 (J. Phys. Chem. Ref. Data., Vol. 9, No. 3 (1980) p. 576) and the refractive index ratio between these wavelengths varies as shown in FIGS. 29 and 30. Data in FIGS. 28-30 and Table 2 shown below was obtained through numerical calculation using a relationship set forth in "Table 1" of the above-mentioned document.

In order to obtain this refractive index ratio that varies little, the optical path length may have to be measured with high accuracy. For example, the refractive index ratio n (λ=5.0 μm)/n(=1.2 μm) varies with temperature most significantly or by $1.0 \times 10^{-5}$ per 1° C. Therefore, for example, in a Si wafer of 800 μm in thickness having an optical path length of about 2800 nm at λ=1.2 μm, assuming that the optical path length at λ=1.2 μm is constant regardless of temperature, it may be found that the optical path length at λ=5.0 μm varies by 0.028 μm per 1° C. Therefore, in order to achieve temperature measurement accuracy at a level of ±1° C., it may be preferable to have an accuracy on the order of 0.028 μm.

The relationship between these values is summarized in Table 2 shown below. Here, because the accuracy in measuring the optical path length in the system shown in this example is on the order of 0.25 μm, temperature repeatability expected in the present system set forth in the Table 2 was calculated using a standard value.

TABLE 2

| | Necessary accuracy in measuring optical thickness per 1° C. (wafer) | Temperature repeatability expected in present system |
|---|---|---|
| 1.5 μm/1.3 μm | 0.0056 μm/° C. | ±40° C. |
| 2.0 μm/1.3 μm | 0.015 μm/° C. | ±16° C. |
| 2.0 μm/1.2 μm | 0.019 μm/° C. | ±13° C. |
| 5.0 μm/1.2 μm | 0.028 μm/° C. | ±10° C. |

(Mode in Which Optical Fibers are Not Used)

FIG. 31 is a block diagram illustrating an example in which optical fibers are not used. When using light having a wavelength longer than 2.5 μm that is likely to be absorbed into optical fiber glass, in order to avoid such absorption as much as possible, it may be preferable to use the shown configuration that does not use optical fibers.

In the example of FIG. 31, a beam of SLD light propagates through air (a medium).

The configuration in FIG. 31 is substantially similar to that in FIG. 27 except that the light is split into the directions to the sample and the reference mirror not by the 2×2 coupler but by a half mirror, and that the air is used in place of the glass fibers as an optical path through which the light propagates.

The present invention will be described below in greater detail based on embodiments thereof.

EXAMPLES

Example 1

(Temperature Measurement Test; Stability of Optical System)

A temperature measurement test was conducted by using the above-described system shown in FIGS. 1, 3 and 4 and Table 1.

When a temperature measurement test is conducted, it is very desirable that the stability of the measurement system be ensured from the very beginning of the test in order to conduct the test with a high accuracy. This is one of the reasons why optical fibers are used as a measured against the disturbances in the interferometer caused by the air. Furthermore, because vibrations distort the interference waveform, the optical platform where each component of the optical system is disposed is protected against vibrations.

The attention should also be paid to measures relating to temperature. Referring to the above-described system configuration, it was mentioned that the light falling from respective light sources is divided in two with optical fiber couplers in both the displacement measurement system and the temperature measurement system of the present system. However, ideally the propagating light paths in the two split optical paths from the measurement sample and corner cube prism in the temperature measurement system and from the fixed mirror and corner cube prism in the displacement measurement system to the point in which the lights are again combined with the optical fiber coupler are the same. This is because if the lights propagate along the paths of different length, the optical fibers are affected differently and finally a certain noise will be included in the data obtained. However, because the reference light and physical body light do not propagate inside the same optical fibers, the distal ends thereof were disposed independently to obtain each reflection. However, at least in order to make them close to one path, the two collimator fibers of the temperature measurement system and two collimator fibers of the displacement measurement system are independently covered with a thermally insulating material and then they are integrated and covered with a thermally insulating material thereby eliminating thermal fluctuations from the outside of the system.

Further, as was described hereinabove with reference to the system configuration, the effect produced on the peripheral optical system by the increase in the temperature of the heater was eliminated by disposing the measurement sample and the heater in the same case, and a constant temperature control of the entire optical system was conducted by covering other components with a box.

Figure 9:
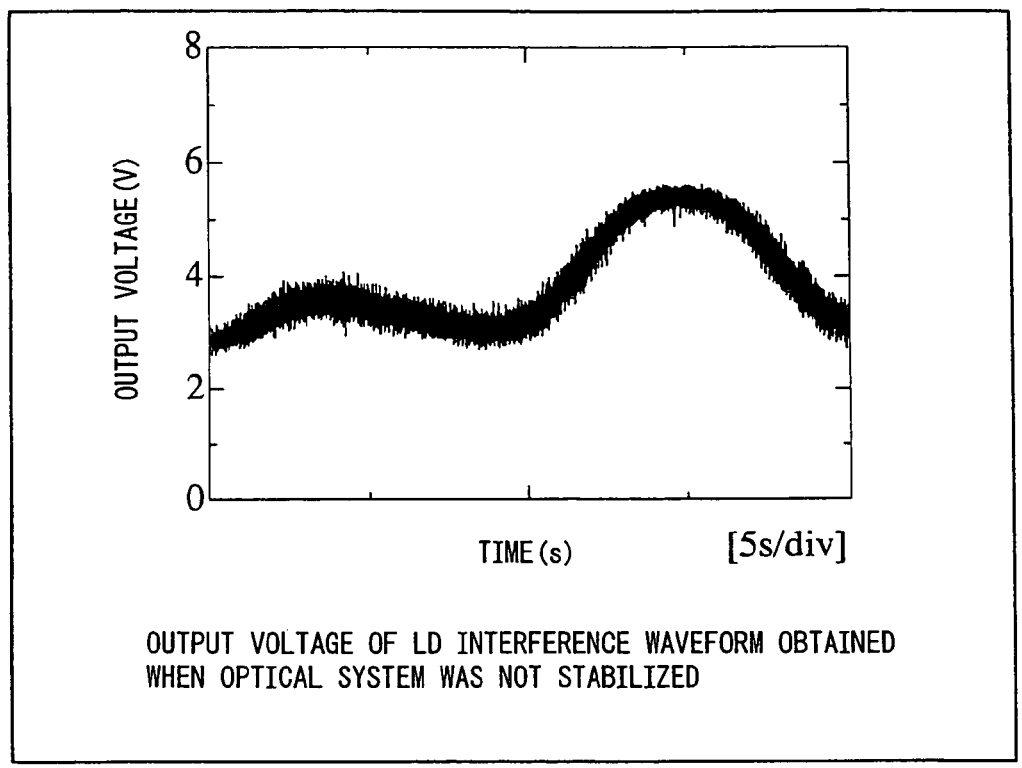
FIG. 9 is a graph illustrating the output voltage of an LD interference waveform obtained when the optical system is not stabilized.
Figure 10:
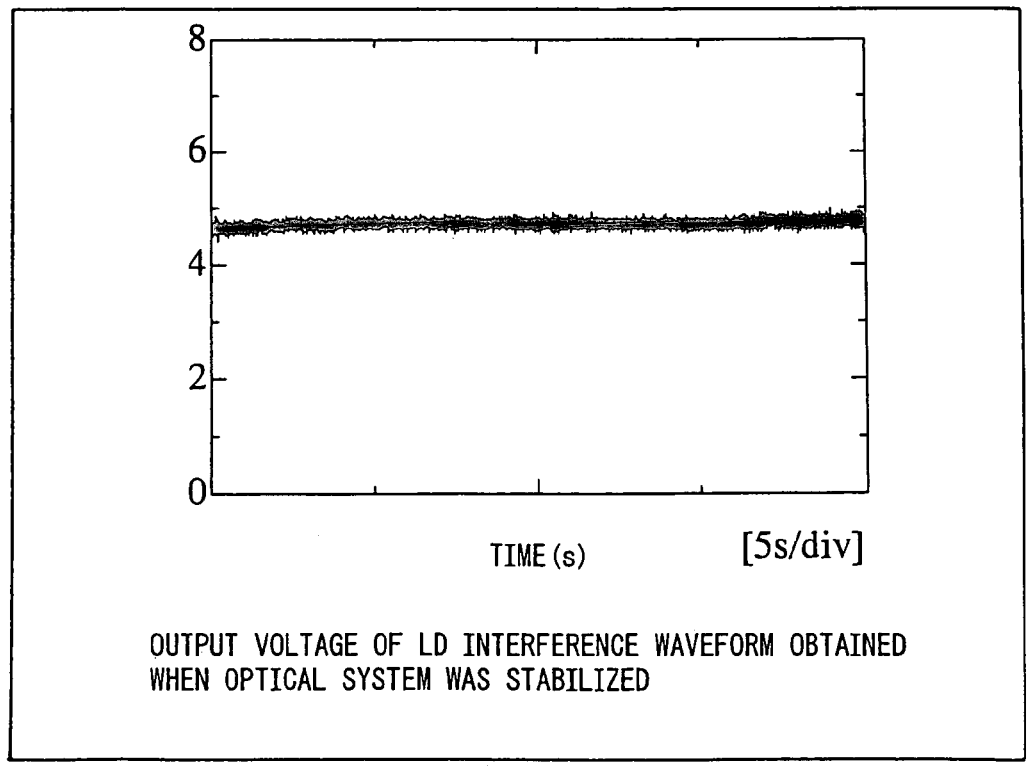
FIG. 10 is a graph illustrating the output voltage of an LD interference waveform obtained when the optical system was stabilized.

Measurements (20 sec) were conducted by picking up data from the displacement measurement system, without driving the voice coil motor, with respect to a configuration in which the entire optical system was covered with a box, as shown in FIG. 9, which is described in the following section, and a configuration in which the entire optical system was covered with a box, as shown in FIG. 10. Time is plotted against the abscissa and output voltage is plotted against the ordinate.

Comparison of FIG. 9 and FIG. 10 confirms that in the optical system that became unstable, the output voltage varied within a range of from 3 V to 8 V, as represented by amplitude width of the graph. The figures also demonstrate that when the stability of the optical system was not ensured, the stability was lost in 7 to 8 sec, but when the stability of the optical system was ensured, the stability was retained for 20 sec.

Those results suggest that in a stable optical system, correct results can be obtained if the measurement time is at least within 20 sec.

Example 2

(Theoretical Analysis and Test Relating to Si Monolayer)

With respect to the system configuration used in Example 1, the analysis was conducted do find how the SLD interference waveform obtained with the temperature measurement system changes in a Si monolayer when the heater temperature rises. Linear expansion coefficient and temperature coefficient of changes in the refractive index were calculated as follows based on the intensity of optical interference explained in the "Low-coherence interferometer" section.

$$\alpha_{Si} = -7.06 \times 10^{-11} \times T^2 + 6.83 \times 10^{-8} \times T + 2.38 \times 10^{-6}$$

$$\beta_{Si,1.55} = -3.33 \times 10^{-11} \times T^2 + 6.76 \times 10^{-6} \times T + 5.01 \times 10^{-5}$$

Figure 11:
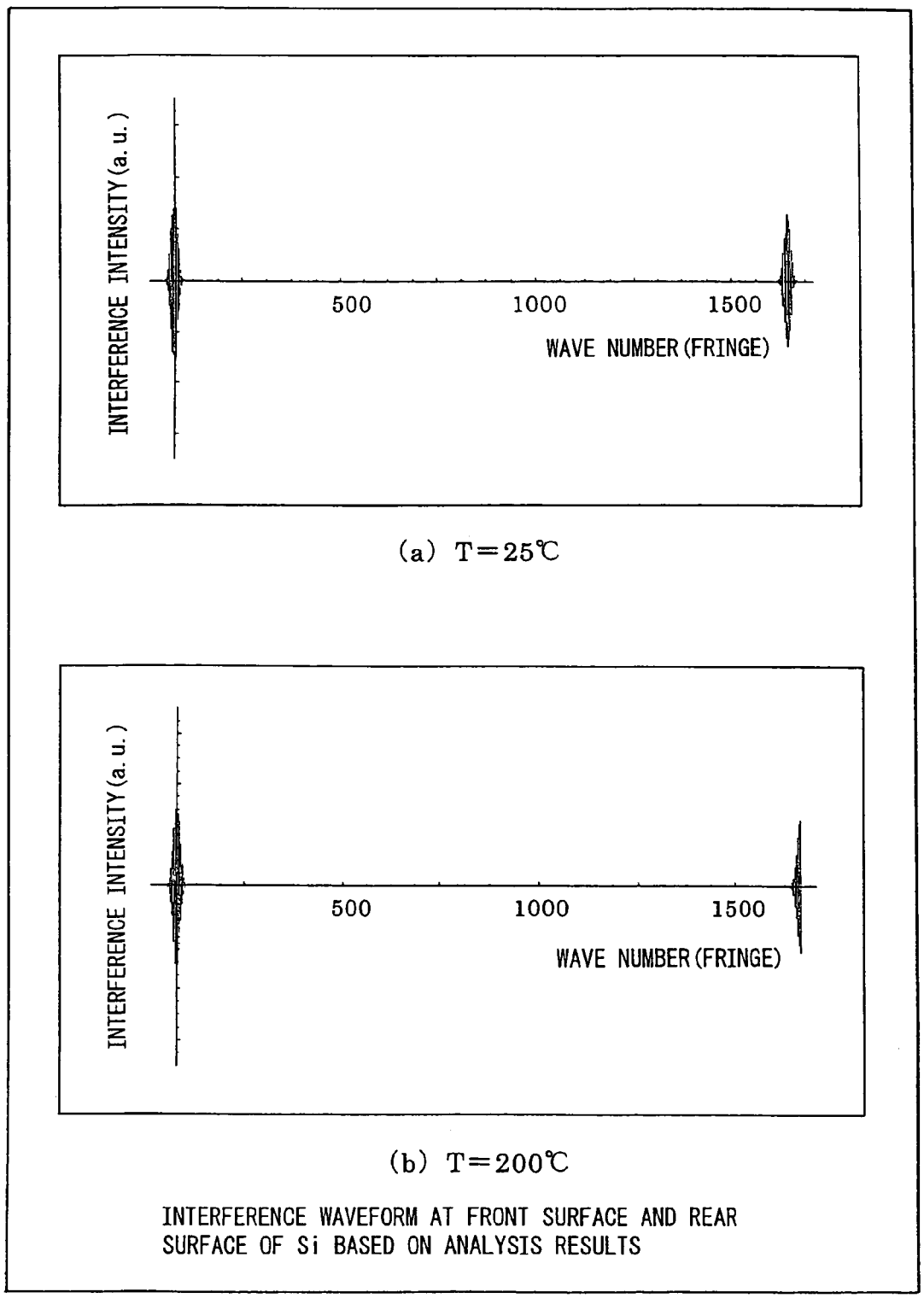
FIG. 11 is a graph illustrating an interference waveform at the front surface and rear surface of Si based on the analysis results.

FIG. 11(*a*) and FIG. 11(*b*) show the analysis results in which the distance from the front surface to the rear surface is represented by a wave number in case the thickness of Si is 364.6 μm and the temperature increased from 25° C. to 200° C. FIG. 11(*a*) shows the interference waveform obtained by conducting the analysis with respect to the space from the front surface to the rear surface of Si at a temperature of 25° C. The results demonstrated that distance between the two peaks was 1618.5 as a wave number determined based on the analysis results. Similarly, for the distance between the front surface and rear surface of Si at a temperature of 200° C., as shown in FIG. 11(*b*), 1641.1 was obtained as a wave number.

Because the displacement is difficult to evaluate by merely comparing FIGS. 11(*a*) and (*b*), the interference waveform in which only the right peak is enlarged is shown in FIGS. 12(*a*), (*b*) to confirm the displacement between the peaks, which accompanies the increase in temperature.

As a result, on the graph shown in FIG. 12, it is clear that the difference of about 22.6 fringes is present. This difference in 22.6 fringes is the difference in distance between the front and rear surfaces as mentioned hereinabove and is clearly based on the changes caused by the increase in temperature.

Mere comparison of the two interference waveforms cannot confirm the difference clearly. For this reason, FIGS. 12(*a*), (*b*) show enlarged abscissa and ordinate of the right peaks of each interference waveform.

As shown in those FIGS. 12(*a*), (*b*), there is a clear phase shift between the front surface and rear surface of Si at temperatures of 25° C. and 200° C.

Example 3

(Test Relating to Si Monolayer)

The test on a Si monolayer was conducted by using the system identical to that of Example 1.

Figure 13:
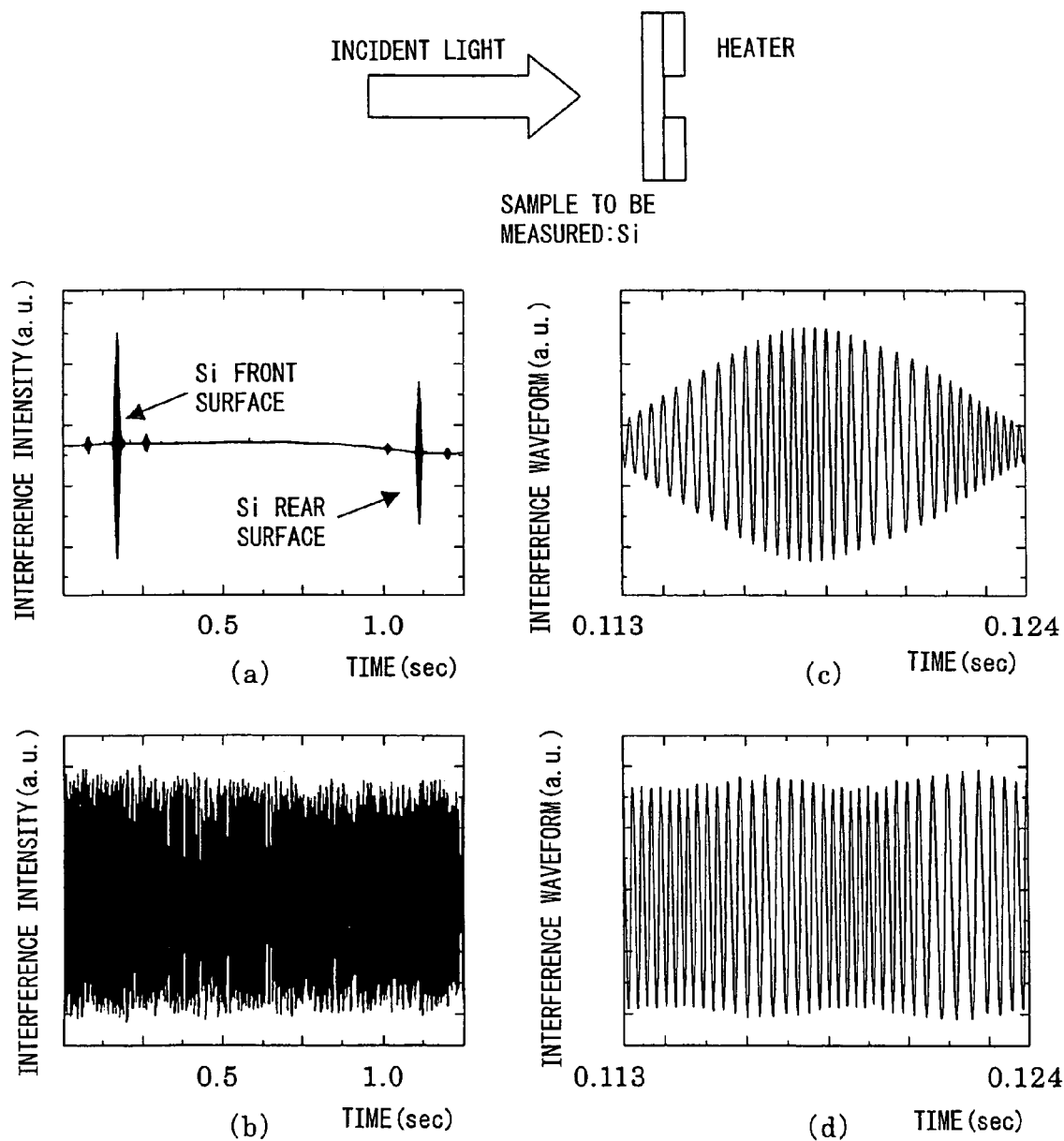
FIG. 13 illustrates mutual arrangement (top) of incident light and a measurement sample Si, SLD interference waveforms (a), (c) obtained from the temperature measurement system, and LD interference waveforms (b), (d) obtained form the displacement measurement system. Here, (c) and (d) are enlarged drawings of the substrate on the front surface of the measurement sample Si.

First, explanation will be conducted based on the detected interference waveform and data actually obtained from the optical system of the present system at room temperature (25° C.). The main parameters of the system used to conduct the test are described below. Si thickness: about 360 μm, Si layer temperature: 25° C., voice coil motor movement distance: 3.0 mm, voice coil motor drive frequency: 0.4 Hz. FIGS. 13(*a*)-(*d*) show the SLD interference waveform obtained from the temperature measurement system and the LD interference waveform obtained from the displacement measurement system under those conditions.

In those analysis results, the interference waveform in the front surface and rear surface of Si is shown. If they are compared with the interference waveform that was actually obtained, two peaks on the left and right side can be observed, and it is clear that there is a distance between interference intensity of the two interference waveforms. The relationship between the incident light and the measurement sample Si is shown in a simplified form in the uppermost portion of FIG. 13. As shown in FIG. 13, in the measurements, the left side of Si is a front surface, and the right side is a rear surface. If the refractive index of air is taken as 1, then the refractive index of Si will be 3.44. Therefore, the reflection factor R on the Si surface in air will be 0.302 and an about 30% reflection will take place. Furthermore, it is well known that the absorption of light with a wavelength of 1.55 μm in Si is extremely small. Therefore, of the remaining 70%, 30% are again reflected on the rear surface. Thus, about 21% of the initial light are reflected. Therefore, the left of the two peaks represents interference results on the front surface of Si, and the right one represents the interference results on the rear surface of Si. Those results demonstrate that the difference in interference intensity is the effect of reflection factor explained in "Measuring temperature of layered structure".

From the above-described parameters, the movement speed, v, of the voice coil motor is about 2.4 mm/sec. Furthermore, the Doppler shift frequency, $f_D$, observed in those measurements is about 3.10 kHz, as calculated from $f_D=2v/\lambda$. The respective enlarged waveforms shown in FIGS. 13(c) and (d) demonstrate match with the test value in both the SLD interference waveform and the LD interference waveform.

The wave number of the LD interference waveform corresponding to the two peaks of the SLD interference waveform determined by the wave number count program was 1618.50 at room temperature (25° C.). In the interferometer using a reciprocally moving drive mechanism, such as a voice coil motor, if the movement distance in one direction is set to l, then the maximum is reached when the condition 2l=mλ (m is integer) is satisfied. From this result it follows that the distance equivalent to 1 period of an enlarged waveform in FIG. 13(c) is 0.775 μm half-wavelength. Therefore, the optical path length of the Si layer corresponding to the wave number of 1618.50 is about 1254.3 μm and the refractive index of Si is 3.44. As a result, it is clear that the thickness of Si that was found in the test is 364.6 μm and almost complete match is attained.

(Case where the Temperature of a Heat Source Heater is Changed)

Changes in the wave number corresponding to the distance between the peaks, that is, changes in the interference waveform within the distance between the front surface and rear surface that were detected when the temperature of the measurement sample Si brought into contact with the heater increased due to changes in the temperature of the heat source heater will be examined below.

Figure 14:
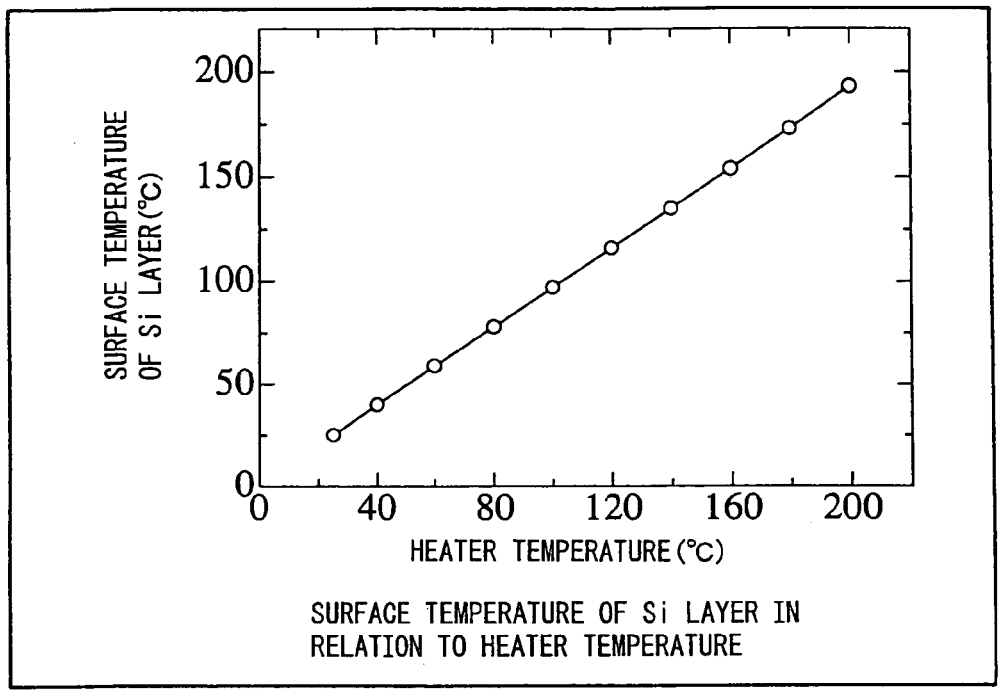
FIG. 14 is a graph illustrating the surface temperature of a Si layer in relation to the heater temperature.

First, it is necessary to examine the temperature of the Si layer of the measurement sample, which changes with the increase in heater temperature. A graph, in which the heater temperature is plotted against the abscissa and the temperature of the front surface of the Si layer measured by using a thermocouple is plotted against the ordinate, is shown in FIG. 14. As for the data plotted against the abscissa, the heater temperature is measured at room temperature (25° C.) as the initial value, and then the measurements are conducted from 40° C. to a maximum of 200° C. with a measurement interval of 20° C. Each numerical value shown in the graph is given to clarify the temperature of the Si surface layer on the ordinate. This graph demonstrates that in the high-temperature portion, the heater temperature is not transferred to the Si layer at all. This suggests that part of the heater heat is transferred to the outer air or the heat of the Si layer is transferred to the outer air and there is a certain loss.

Figure 15:
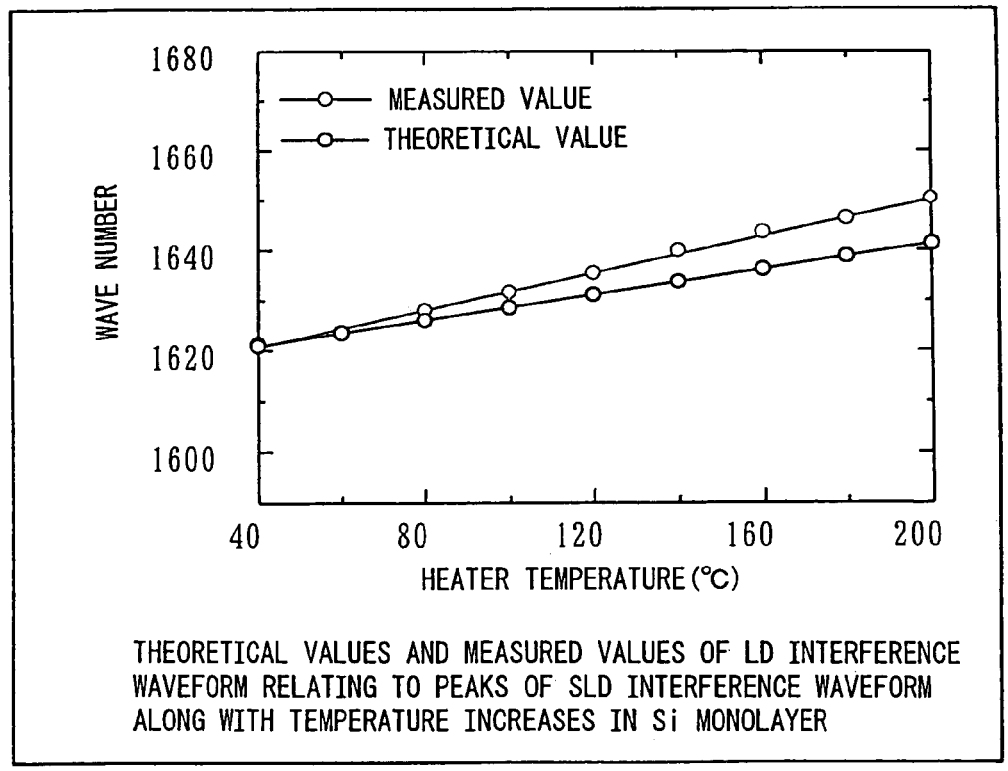
FIG. 15 is a graph illustrating the frequency theoretical and experimental values of LD interference waveform relating to the zone between the peaks of the SLD interference waveform that accompanies temperature increase in a Si monolayer.

In the graph shown in FIG. 15, the heater temperature is plotted against the abscissa and the wave number found by theoretical analysis and the results obtained by measuring the changes between the peaks of the SLD interference waveform detected with the temperature measurement system at a wave number of the LD interference waveform obtained from the displacement measurement system is plotted against the ordinate. The initial values correspond to room temperature (25° C.), at a temperature above 40° C., the measurements were conducted for each 20° C.

From the above-described results, it was obtained that the thickness of the Si that was used was about 364.6 μm, based on the test results. The analysis conducted with respect to changes in temperature based on this value has already been described above (measurements in Si monolayer). FIG. 15 shows the data obtained in the test and the theoretic values of the wave number depending on the increase in temperature and obtained by taking into account the temperature coefficient of changes in the refractive index and linear expansion coefficient relating to the above-described Si.

The results show that the wave number found from the theoretic values and the wave number of the LD interference waveform corresponding to the distance between the peaks of the SLD interference waveform at each temperature that was obtained in the test have somewhat different inclinations with respect to temperature.

Here, the main factors resulting in this error of the inclination will be discussed based on formula (3-14). Formula (3-14) will be explained with $SiO_2$ as an example, but a similar formula also relates to Si. Therefore, replacing the symbols $SiO_2$ with Si, we can obtained.

$$\Delta l_{Si}=l'_{Si}-l_{Si}=n_{Si}\cdot d_{Si}(\alpha_{Si}+\beta_{Si})\Delta T$$

In case of Si, if the following values are considered: $n_{Si}=3.44$, $d_{Si}=360$ μm, $\alpha_{Si}=2\text{-}4\times10^{-6}$ °C.$^{-1}$, $\beta_{Si}=5\text{-}6\times10^{-5}$ °C.$^{-1}$, $\Delta T=200°$ C.$-25°$ C.$=175°$ C., then from $\alpha_{Si}<<\beta_{Si}$, changes in the optical path length will be $2\times\Delta l_{Si}$. Therefore, we can obtain the following:

$$2\Delta l_{Si}\approx 2n_{Si}\cdot d_{Si}\cdot\beta_{Si}\Delta T$$

Changes caused by the optical path displacement in Si as well as a temperature measured error caused by a thermocouple and the measurement error of the values cited from reference sources are considered as the error factors.

For example, if changes caused by the optical path displacement are considered as the main factor, then for a 5-fringe displacement, $\Delta d_{Si}\approx 94$ μm is obtained from $2l\Delta_{Si}=5\times 1.55$ μm, and such a displacement is difficult to consider. Further, the temperature measurement error caused by a thermocouple also becomes $\Delta T\approx 46°$ C.μm and this also cannot be considered as a reason for the aforementioned changes. If the measurement error of $\beta_{Si}$ is considered, then $\Delta\beta_{Si}=1.4\times10^{-5}$ °C.$^{-1}$ is obtained, and if the measured value of $\beta_{Si}$ is about $7.4\times10^{-5}$ °C.$^{-1}$ from $6.0\times10^{-5}$ °C.$^{-1}$ at 200° C., then the result can be explained.

Thus, the error in the inclination of the straight lines can be assumed to be caused by the measurement error from reference sources or the measurement error caused by disturbances such as vibrations in the present system.

Further, the displacement of measured values from the straight line can be considered to be mainly due to disturbances caused by vibrations during measurements.

The present test results demonstrate a 28.7-fringe difference at a temperature of Si layer of 25° C. and 193° C. From the present test results, a change in temperature of about 5.8° C. per 1 fringe can be established. In order to realize a resolution of 1° C. or less, a resolution of ⅙ fringe or less is required, and it is clear that suppression of disturbances such as vibrations is highly desired.

Example 4

(Test Relating to $SiO_2$ Monolayer)

Test results relating to a $SiO_2$ monolayer will be shown similarly to the results of Example 3 (Test relating to Si monolayer). The main parameters of the system were as follows. $SiO_2$ thickness: about 1 mm, Si layer temperature: 25° C., voice coil motor movement distance: 3.0 mm, voice coil motor drive frequency: 0.3 Hz. FIGS. 16(e) to (h) show the SLD interference waveform obtained from the temperature measurement system and the LD interference waveform obtained from the displacement measurement system in this case. Two peaks, on the left and on the right, can be obtained in the interference waveform that was actually obtained, but this time practically no difference between the outputs of the two interference waveforms was observed. Because the refractive index of SiO$_2$ is 1.46, the reflection factor R on the SiO$_2$ surface in air will be 0.035 and an about 3.5% reflection will take place. Of the remaining 96.5%, 3.5% are again reflected on the rear surface. As a result, about 3.4% of the initial light are reflected. The left of the two peaks represents interference waveform on the front surface of SiO$_2$, and the right one represents the interference results on the rear surface of Si. From the above-described parameters, the movement speed, v, of the voice coil motor becomes about 1.8 mm/s. Furthermore, the Doppler shift frequency $f_D$ observed in those measurements is about 2.32 kHz and good match with the test values is obtained in both the SLD interference waveform and the LD interference waveform.

When the wave number of the LD interference waveform relating to the spacing between the two peaks of the SLD interference waveform that was determined by the wave number count program was read, the result was 1927.6. For SiO$_2$, data representing the dependence on temperature were not available. For this reason, the following constant values were used for the linear expansion coefficient and temperature coefficient, β, of changes in the refractive index.

$\alpha_{SiO2} = 5.0 \times 10^{-7}$ $\beta_{SiO2} = 7.0 \times 10^{-6}$

It follows herefrom that the optical path length inside the SiO$_2$ layer corresponding to a wave number of 1927.6 is 1493.9 μm. Further, because the refractive index of SiO$_2$ is 1.46, the thickness of SiO$_2$ found in the test is about 1023.2 μm and the data almost match. Further, the temperature of the front surface measured with a thermocouple when the temperature of SiO$_2$ was increased was examined by changing the temperature of the heat source heater. The results are shown in FIG. 17.

Figure 18:
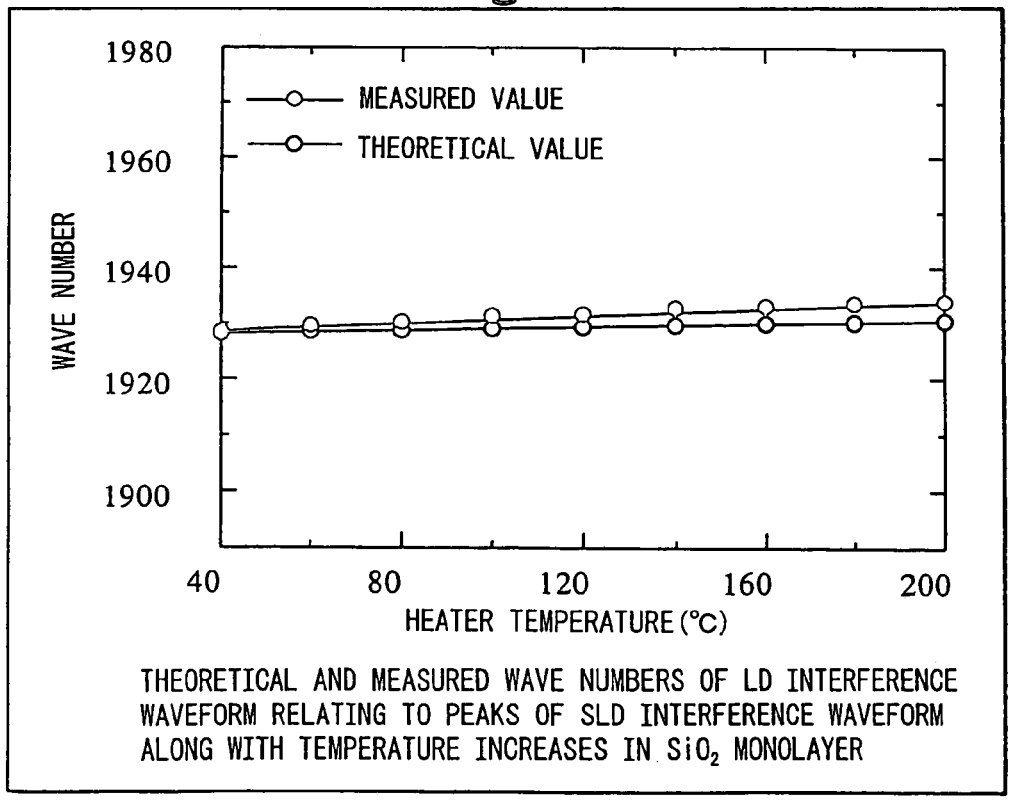
FIG. 18 is a graph illustrating the frequency theoretical and experimental values of LD interference waveform relating to the zone between the peaks of the SLD interference waveform that accompanies temperature increase in a $SiO_2$ monolayer.

FIG. 18 shows a grain in which the heater temperature is plotted against the abscissa, and the results obtained in measuring the optical path length between the peaks of the SLD interference waveform detected with the temperature measurement system at a wave number of the LD interference waveform obtained from the displacement measurement system are plotted against the ordinate.

Figure 17:
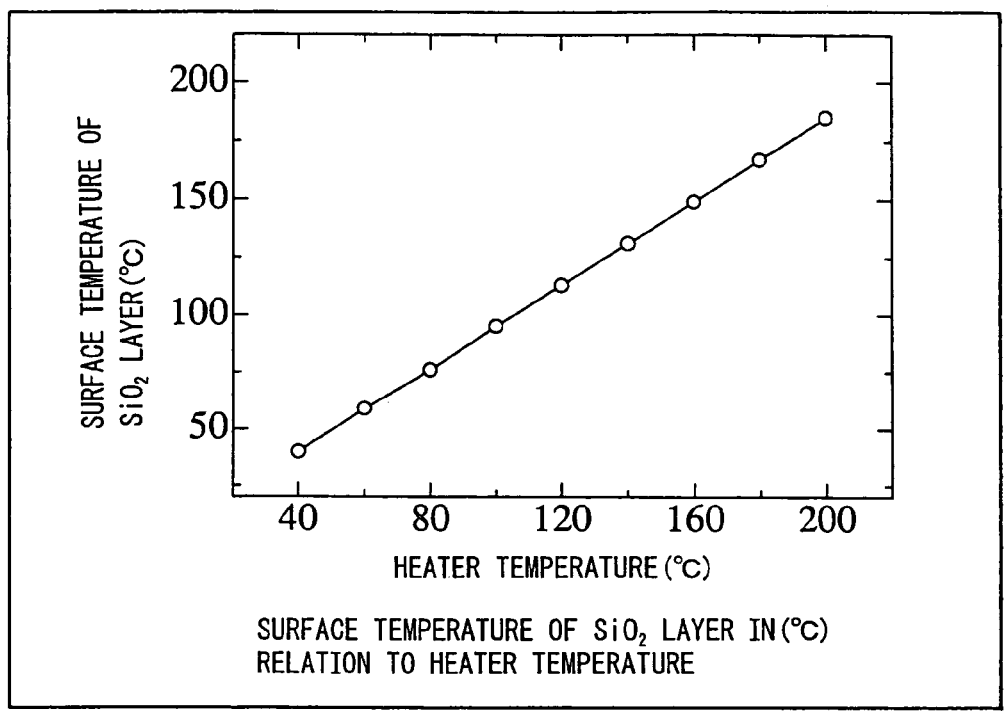
FIG. 17 is a graph illustrating the temperature of the front surface of a $SiO_2$ layer, those results being related to a heater temperature.

It follows from FIG. 17 that because SiO$_2$ has a low thermal conductivity, the surface temperature becomes lower than that of Si shown in FIG. 14. Furthermore, it follows from FIG. 18 that, similarly to Si, the difference with the theoretic values increases with the increase in temperature. This result suggests that an assumption that the $\beta_{SiO2}$ is constant against the temperature, which was made in the theoretic analysis, is the main cause of the error. However, the temperature dependence of $\beta_{SiO2}$ can be inversely evaluated from the measurement results, and temperature measurements can be conducted by using this evaluated value.

The present test results demonstrate a 5.4-fringe difference at a temperature of SiO$_2$ layer of 25° C. and 185° C. From the present test results, a change in temperature of about 29.6° C. per 1 fringe can be established and in order to realize a resolution of 1° C., it is necessary to measure fringes with an accuracy of about 1/10.

Example 5

(Temperature Measurements using Layered Structure of Silicon and Quartz)

Measurements were conducted by using a structure of laminated Si and SiO$_2$. In this case, the thickness of Si and SiO$_2$ layers was 360 μm and 1 mm, respectively, and the optical path length was 1.23 μm and 1.46 μm, respectively. Therefore, in case of the laminated structure, the thickness was 1.36 mm and the optical path length was 2.69 mm. Therefore, the drive distance of 2.69 mm and more is necessary. A voltage of 3.0 V is applied to the voice coil motor, the drive distance is 3.6 mm, the operation frequency is 0.1 Hz, and the drive is conducted at a speed of about 0.36 mm/sec. In this case, too, similarly to a single body structure, the temperature of the front surface was directly measured with a thermocouple and the temperature of the rear surface was measured as a heater temperature.

Figure 19:
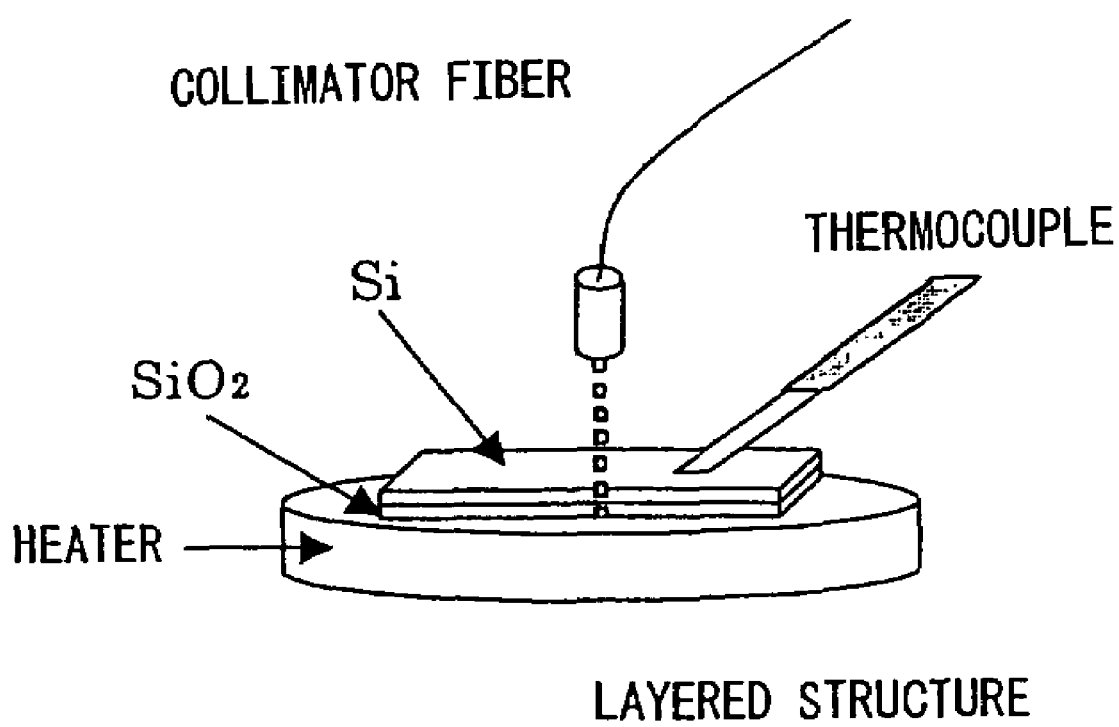
FIG. 19 is a schematic perspective view illustrating a multilayer structure used in the embodiments.

As shown in FIG. 19, the temperature was measured when the layers were laminated so that Si was at the top and SiO$_2$ was at the bottom. Measurement results relating to the Si layer, which is the upper layer, are shown in FIG. 20(*a*). It follows from those results that if the approximately straight lines obtained for a Si single body and a Si layer of the layered structure are compared, then the inclination of the line obtained for the layered structure is less than the inclination of the line obtained for the Si single body. Furthermore, the measured values for Si in a layered structure are slightly less. This is apparently because the temperature of the heater was not sufficiently transferred to the Si layer because SiO$_2$, which does not have good thermal conductivity, was placed between the heater and Si. It follows from FIG. 20(*a*) and FIG. 14 that in the Si layer of the layered structure and the Si single body, the difference in temperature is about 20° C. at a heater temperature of 200° C.

Figure 21:
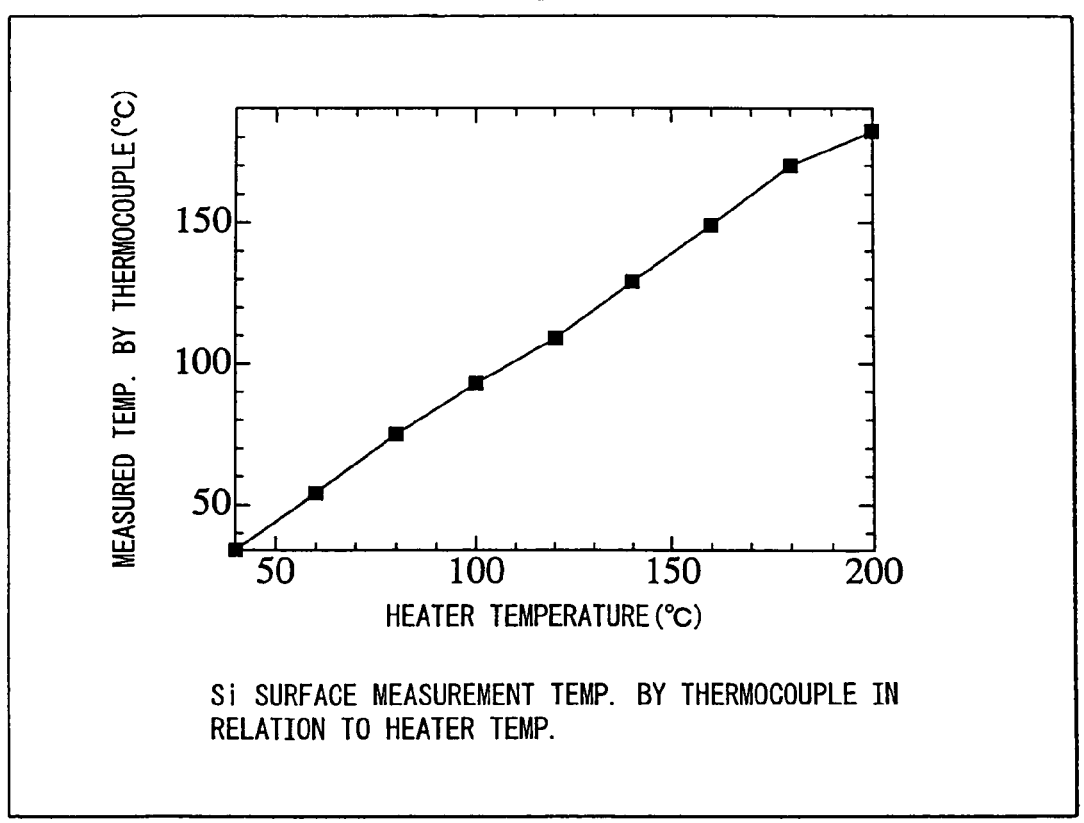
FIG. 21 is a graph illustrating the results obtained in measuring the temperature of Si with a thermocouple, those results being related to a heater temperature.

On the other hand, FIG. 21 shows the temperature of the front surface of Si measured with a thermocouple as a function of heater temperature. If this graph is compared with the temperature of the front surface of the Si single body, which is shown in FIG. 14, then a difference of about 15° C. exists at a temperature of 200° C. and the results almost match each other, the difference therebetween being about 5° C. Further, FIG. 20(*b*) shows changes in the wave number in the SiO$_2$ layer of the layered structure and the SiO$_2$ single body. It follows from this figure that there is a certain spread in the measured values, but it is clear that the two values practically do not change. This is apparently because the SiO$_2$ layer is in contact with the heater and the temperature of the SiO$_2$ practically does not change with respect to that of the single body.

As shown by the above-described embodiments, a system for measuring the temperature of a layered structure using a low-coherence interferometer of an optical fiber type was constructed.

Using a corner cube prism and a voice coil motor as a reference mirror drive mechanism of the system made it possible to stabilize the large depth measurements. Furthermore, using an optical fiber interferometer employing a semiconductor layer made it possible to measure the displacement of the reverence mirror with a high accuracy.

In the above-described embodiments changes in the optical path length were examined with respect to a Si substrate single body by theoretic analysis when the temperature was raised. Then, actual temperature measurements were conducted with respect to Si and SiO$_2$ substrates. The comparison of the interference wavelength obtained with the temperature measurement system and the interference wavelength obtained with the displacement measurement system following increase in temperature confirmed that the optical path length of each layer changes from a state before the temperature has changed to a state after the temperature has changed, following changes in linear expansion coefficient and refractive index. As a result, changes in the optical path length caused by the increase in the heater temperature slightly differed from the theoretic analysis results. Close inspection of this result suggested that this is due to the accuracy of thermal coefficient β of changes in the refractive index used in the theoretic analysis or to the effect of disturbances caused by vibrations during measurements.

It followed from the above-described measurement results that when Si with a thickness of about 360 μm was used and when $SiO_2$ with a thickness of about 1000 μm was used, a respective resolution of no less than ⅙ fringe and 1/10 fringe of the LD interference wavelength was necessary to obtain a resolution of 1° C.

Similar measurements were also conducted with respect to a layered structure composed of Si and $SiO_2$. The $SiO_2$ layer located directly above the heater showed changes in the wave number almost identical to those of a single body. However, in the Si layer located above the $SiO_2$ layer, changes in the wave number were slightly less than those of the Si single body and almost matched the value obtained by direct thermocouple measurements on the front surface of the Si layer.

It was thus confirmed that with the system used in those embodiments, the temperature of each layer of the layered structure can be measured separately.

As described hereinabove, the present invention can provide a method for measuring temperature, which is suitable for directly measuring the temperature of the outermost surface of a substrate or the like.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic International Application No. PCT/JP03/04792, filed on Apr. 15, 2003, is hereby incorporated by reference.

What is claimed is:

1. A method for measuring temperature, comprising:
   irradiating a substrate with a plurality of lights of different wavelengths;
   determining a ratio of optical path lengths between the plurality of lights reflected by a front surface or a rear surface of the substrate; and
   determining the temperature of the substrate based on the ratio of the optical path lengths.

2. A method for measuring temperature, comprising:
   irradiating a substrate with a first light that includes a first wavelength so that interference occurs between a portion of the first light reflected by a front surface or a rear surface of the substrate and a first reference light that includes a first variable optical path length measuring a position of the reflection of the first light from intensity variation of a first interference light, and determining a first optical thickness of the substrate at the first wavelength by multiplying a thickness of the substrate by a refractive index of the substrate at the first wavelength;
   concurrently with the measuring the position of the reflection of the first light irradiating the substrate with a second light of a second wavelength different from the first wavelength so that interference occurs between a portion of the second light reflected by the front surface or the rear surface of the substrate and a second reference light that includes a second variable optical path length, measuring a position of the reflection of the second light from intensity variation of a second interference light, and determining a second optical thickness of the substrate at the second wavelength by multiplying the thickness of the substrate by a refractive index of the substrate at the second wavelength; and
   determining the temperature of the substrate based on a ratio of the first optical thickness to the second optical thickness.

3. A method for measuring temperature according to claim 2, wherein the first light has a wavelength of 1.0-2.0 μm and the second light has a wavelength of 2.0-5.0 μm.

4. A method for measuring temperature according to claim 3, wherein the first light has a wavelength of 1.0-1.2 μm.

5. A method for measuring temperature according to claim 3, wherein the substrate is formed of silicon or silicon oxide.

6. An apparatus for measuring temperature, comprising:
   light source means for irradiating a front surface or a rear surface of a substrate with a light;
   a splitter that splits the light into a reference light and a measurement light;
   reference light reflecting means for reflecting the reference light;
   optical path changing means for changing an optical path length of light reflected from the reference light reflecting means; and
   light receiving means for measuring an interference of the reflected light from the substrate and the reference light from the reference light reflecting means,
   wherein a temperature of at least one of the front surface, rear surface or inside of the substrate is measured based on a measurement of the interference;
   wherein the light source means comprises:
      one light source or two light sources having different wavelengths that measure the temperature of the substrate; and
      a displacement-measuring light source that measures the displacement in the optical path changing means; and
   wherein the light receiving means comprises:
      one or two light-receiving devices corresponding to the one or two light sources that receive the interference light based on the light from the one or two light sources that has been reflected from the substrate and the reference light reflecting means; and
      a displacement-measuring light-receiving device that receives the interference light based on the light from the displacement-measuring light source that has been reflected from the substrate and the reference light reflecting means.

7. An apparatus for measuring temperature according to claim 6, wherein the light source for measuring the temperature of the substrate has a wavelength of 0.3-20 μm, and a coherence length of 0.1-100 μm.

8. An apparatus for measuring temperature according to claim 6, wherein the light source means comprises two light sources, one of which has a wavelength providing a relatively large temperature coefficient of change in refractive index of the substrate, and the other of which has a wavelength providing a relatively small coefficient of temperature change in the refractive index of the substrate.

* * * * *